US007279534B2

(12) United States Patent
Luebben et al.

(10) Patent No.: US 7,279,534 B2
(45) Date of Patent: Oct. 9, 2007

(54) POLY(HETEROAROMATIC) BLOCK COPOLYMERS WITH ELECTRICAL CONDUCTIVITY

(75) Inventors: Silvia DeVito Luebben, Golden, CO (US); Brian Elliott, Superior, CO (US); Carolina Wilson, Arvada, CO (US)

(73) Assignee: TDA Research, Inc., Wheat Ridge, CO (US)

(*) Notice: Subject to any disclaimer, the term of this patent is extended or adjusted under 35 U.S.C. 154(b) by 0 days.

(21) Appl. No.: 10/234,968

(22) Filed: Sep. 3, 2002

(65) Prior Publication Data

US 2003/0088032 A1 May 8, 2003

Related U.S. Application Data

(60) Provisional application No. 60/316,607, filed on Aug. 31, 2001.

(51) Int. Cl.
C08F 26/06 (2006.01)
C08F 234/04 (2006.01)

(52) U.S. Cl. ............... 525/410; 525/411; 525/412; 525/413; 525/417; 528/378; 528/380; 528/403

(58) Field of Classification Search ............... 528/378, 528/380, 403; 525/410, 411, 412, 413, 417
See application file for complete search history.

(56) References Cited

U.S. PATENT DOCUMENTS

| | | | |
|---|---|---|---|
| 3,278,437 A | 10/1966 | Lyman et al. | |
| 3,652,724 A | 3/1972 | Shimomura et al. | |
| 3,673,272 A | 6/1972 | Dean | |
| 3,725,505 A | 4/1973 | O'Malley | |
| 3,816,314 A | 6/1974 | Pappas et al. | |
| 3,907,929 A | 9/1975 | Guilbault et al. | |
| 3,993,712 A | 11/1976 | Guilbault et al. | |
| 4,554,093 A | 11/1985 | Aldissi | |
| 4,608,129 A | 8/1986 | Tamamura et al. | |
| 4,707,527 A | 11/1987 | Druy et al. | 525/417 |
| 4,900,782 A | 2/1990 | Han et al. | 525/398 |
| 4,935,164 A | 6/1990 | Wessling et al. | |
| 4,959,430 A | 9/1990 | Jonas et al. | |
| 4,985,124 A | 1/1991 | Claussen et al. | |
| 4,987,042 A | 1/1991 | Jonas et al. | 429/213 |
| 5,035,926 A | 7/1991 | Jonas et al. | |
| 5,071,524 A | 12/1991 | Claussen et al. | |
| 5,095,076 A | 3/1992 | Clement et al. | |
| 5,227,092 A | 7/1993 | Han | |
| 5,232,631 A | 8/1993 | Cao et al. | |
| 5,254,633 A | 10/1993 | Han et al. | |
| 5,300,575 A | 4/1994 | Jonas et al. | 525/186 |
| 5,498,761 A | 3/1996 | Wessling et al. | |
| 5,549,851 A | 8/1996 | Fukushima et al. | |
| 5,552,216 A | 9/1996 | Sugimoto et al. | |
| 5,567,355 A | 10/1996 | Wessling et al. | |
| 5,571,454 A | 11/1996 | Chen et al. | |
| 5,589,108 A | 12/1996 | Shimizu et al. | |
| 5,589,565 A | 12/1996 | Wudl et al. | |
| 5,616,669 A | 4/1997 | Jin et al. | |
| 5,635,563 A | 6/1997 | Oka | |
| 5,670,607 A | 9/1997 | Chen | |
| 5,728,321 A | 3/1998 | Abe et al. | |
| 5,759,637 A | 6/1998 | Angelopoulos et al. | |
| 5,792,558 A | 8/1998 | Jonas et al. | 428/419 |
| 5,795,942 A | 8/1998 | Rhee et al. | |
| 5,837,859 A | 11/1998 | Teoule et al. | |
| 5,843,741 A | 12/1998 | Wong et al. | |
| 5,863,981 A | 1/1999 | Wudl et al. | |
| 5,866,043 A | 2/1999 | Ikkala et al. | |
| 5,871,671 A | 2/1999 | Kinlen et al. | 252/500 |

(Continued)

FOREIGN PATENT DOCUMENTS

EP 440957 8/1991

(Continued)

OTHER PUBLICATIONS

Aime, J.P. (1991), "Structural Characterization of Conjugated Polymer Solutions," in *Conjugated Polymers*, Brédas, J.L. and Silbey, R. (eds.), Kluwer Academic Publishers, pp. 259-267.
Carey, F. and Sundberg, R. (1990), *Advanced Organic Chemistry*, Third Ed., Part A, Plenum Press, New York, p. 531.
Chandrasekhar, P. (1999) *Conducting Polymers, Fundamental and Applications*, Kluwer Academic Publishers, Boston, pp. 3-22 and 277-280.
François, B. and Olinga, T. (1993), "Polystyrene-Polythiophene Block Copolymers (PS-PT) Synthesis, Characterization and Doping," *Synthetic Metals* 55-57:3489-3494.
François, B. et al. (1995), "Block-copolymers with conjugated segments: Synthesis and structural characterization," *Synthetic Metals* 69:463-466.

(Continued)

Primary Examiner—Jeffrey Mullis
(74) Attorney, Agent, or Firm—Greenlee, Winner and Sullivan, P.C.

(57) ABSTRACT

The present invention provides block copolymers containing at least one block of a poly(heteroaromatic) polymer and at least two blocks of a non-conjugated polymer. The chemically different blocks of the copolymer are covalently bonded to each other in an alternating fashion through an appropriate linkage group. The poly(heteroaromatic) block may exist in its neutral or oxidized form, and when in the oxidized form, it associates with organic or inorganic counter-anions to balance the charge. The poly(heteroaromatic) polymer is an intrinsically conducting polymer (ICP), and when in the oxidized form it is electrically conducting. When the ICP block or blocks of the block copolymer are in the doped form, the block copolymer is electrically conducting. Preferably the conducting block copolymers have conductivities in the range $10^{-6}$-$10^{3}$ S/cm. Block copolymers of this invention are soluble or dispersible in water, one or more organic solvents, or in a mixture thereof at a level of at least about 0.1 g/liter.

51 Claims, 4 Drawing Sheets

U.S. PATENT DOCUMENTS

| | | | |
|---|---|---|---|
| 5,908,898 A | 6/1999 | Wan-Cheng et al. | |
| 5,917,693 A | 6/1999 | Kono et al. | |
| 5,929,172 A | 7/1999 | Zajaczkowski | |
| 5,932,144 A | 8/1999 | Shimizu et al. | |
| 5,958,301 A | 9/1999 | Angelopoulos et al. | |
| 5,968,417 A | 10/1999 | Viswanathan | |
| 5,976,418 A | 11/1999 | Fuller et al. | |
| 5,980,784 A | 11/1999 | Shimizu et al. | |
| 5,993,694 A | 11/1999 | Ito et al. | |
| 5,993,696 A | 11/1999 | Hanhi et al. | |
| 5,994,498 A | 11/1999 | Tripathy et al. | |
| 6,004,483 A | 12/1999 | Jonas et al. | 252/500 |
| 6,010,645 A | 1/2000 | Angelopoulos et al. | |
| 6,025,462 A | 2/2000 | Wang et al. | |
| 6,095,148 A | 8/2000 | Shastri et al. | |
| 6,099,757 A | 8/2000 | Kulkarni | |
| 6,103,145 A | 8/2000 | Angelopoulos et al. | |
| 6,107,439 A | 8/2000 | Yanus et al. | |
| 6,602,974 B1 | 8/2003 | McCullough et al. | 528/73 |

FOREIGN PATENT DOCUMENTS

| | | |
|---|---|---|
| JP | 06 256509 | 9/1994 |
| WO | WO97/04464 | 2/1997 |
| WO | WO97/16545 | 5/1997 |
| WO | WO99/16084 | 4/1999 |
| WO | WO99/19391 | 4/1999 |
| WO | WO 00/24816 | 5/2000 |

OTHER PUBLICATIONS

Freedman, H.H. and Dubois, R.A. (1975), "An Improved Williamson Ether Synthesis Using Phase Transfer Catalysis," *Tetrahedron Lett.*, No. 38, p. 3251-3254.
Groenendaal, L. et al. (Apr. 2000), "Poly(3,4-ethylenedioxythiophene) and Its Derivatives: Past, Present, and Future," *Advanced Materials* 12:481-494.
Gumbs, R. W. (1997), "Polythiophene and Polypyrrole Copolymers," in *Handbook of Organic Conductive Molecules and Polymers*, Singh Nalwa, H. (ed.), John Wiley & Sons, pp. 469-503.
Hopkins, A.R. et al. (1996), "Characterization of Solution and Solid State Properties of Undoped and Doped Polyanilines Processed from Hexafluoro-2-propanol," *Macromolecules* 29:7838-7846.
Jin, S. et al. (Jun. 2000), "Electrochemical Copolymerization of Pyrrolo and Styrene," *Macromolecules* 33:4805-4808.
Keegstra, M.A. et al. (1992), "Copper (I) Halide Catalysed Synthesis of Alkyl Aryl and Alkyl Heteroaryl Ethers," *Tetrahedron* 48:3633-3652.
Kinlen, P. et al. (1999), "Synthesis and Characterization of Organically Soluble Polyaniline and Polyaniline Block Copolymers," *Synthetic Metals* 101:758-761.
Lazzaroni et al. (1999), "Microstructure of block copolymers containing a conjugated segment, as studied with atomic force microscopy," *Synthetic Metals* 102:1279-1282.
Leclère, P. et al. (Jul. 2000), "Highly Regular Organization of Conjugated Polymer Chains via Block Copolymer Self-Assembly," *Adv. Mater.* 12(14):1042-1046.
Leung, L. and Tan, K.H. (1993), "Synthesis and Electrical Properties of Polyacetylene Copolymers from Poly(phenyl vinyl sulfoxide) and Its Oxidized Products," *Macromolecules* 26:4426-4436.
Li, S. et al. (1989), "Synthesis and Characterization of Soluble Polyaniline," *Synthetic Metals* 29:E329-E336.
Mohanakrishnan et al. (1999), "Functionalization of 3,4-Ethylenedioxythiophene," *Tetrahedron* 55:11745-11754.
Naarmann, H. and Theophilou, N. (1988), "Synthesis of New Electronically Conducting Polymers," in *Electroresponsive Molecular and Polymeric Systems*, vol. 1, Skotheim, T.A. (ed.), Marcel Dekker, Inc., New York and Basel, pp. 1-39.

Rajappa, S. (1984), "Thiophenes and Their Benzoderivatives: (ii) Reactivity" in *Comprehensive Heterocyclic Chemistry*, Bird, C and Cheeseman, G. (eds.), Pergamon Press, Oxford, p. 771.
Van Hutten, P.V. et al. (1995), "Structure of Thiophene-Based Regioregular Polymers and Block Copolymers and Its Influence on Luminescence Spectra," *J. Phys. Chem.* 99:3218-3224.
Vogel, A.I. (1998) *Textbook of Practical Organic Chemistry*, 5th Ed., reprint Longman, Singapore, pp. 557-559 and 583-585.
Wagner, Z. et al. (Aug. 2001), "Rigid-Flexible Alternating Block Copolymers That Contain Poly(p-phenylene) Units of Defined Length as the Rigid Blocks," *Macromolecules* 34:5740-5743.
Wessling, B. (1998) "Dispersion as the Key to Processing Conducting Polymers," in *Handbook of Conducting Polymers*, 2nd Ed., Skotheim, T.A. et al. (eds.), Marcel Dekker, New York, pp. 471-473.
Zhang, G. and Bi, X. (1991), "Electrically Conductive Blocked Copolymer of Polyaniline and Poly(p-Phenylene-Terephthalamide)," *Synthetic Metals* 41-43:251-254.
Biran, C. (Nov. 2002), "Mechanical Properties of Conducting H-Type Polysiloxane-Polypyrrole Graft Copolymers and Polytetrahydrofuran-Polypyrrole Graft Copolymers and Polytetrahydrofuran-Polypyrrole Block Copolymers," *J. Appl. Polym. Sci.* 86:1663-1666.
Bozkurt, A. et al. (Jul. 2002), "Conduction Mechanism in H-Type Polysiloxane-Polypyrrole Block Copolymers," *J. Appl. Polym. Sci.* 85:52-56.
Rivers, T.J. (Jan. 2002), "Synthesis of a Novel, Biodegradable Electrically Conducting Polymer for Biomedical Applications," *Adv. Func. Mater.* 12(1):33-37.
Ustamehmetoglu, B. (Oct. 2001), "Soluble Polypyrrole Copolymers," *J. Appl. Polym. Sci.* 82:1098-1106.
Cho et al. (Dec. 2003) "Intra-Molecular Energy Transfer Characteristics of Novel Oligo(thienylphenyl)amine Derivatives Having a Gradient Structure," *Macromol. Chem. Phys.* 204:2175-2182.
Fujitsuka et al. (published on Web Dec. 2002) (2003) "Photoexcitation and Electron Transfer Properties of Rod- and Coil-Type Oligo(thienylene-ethynylene)s," *J. Phys. Chem. B* 107:739-746.
Heywang and Jonas (1992) Poly(alkylenedioxythiophene)s New, Very Stable Conducting Polymers, *Adv. Mater.* 4(2):116-118.
Jin et al. (pub. in or prior to Aug. 2004) "Main Chain Perfluorocyclobutyl (pfcb) Liquid Crystalline Polymers with Oligo-P-Phenylene Vertebrae," *Polymer Preprints* 45(2):91.
de Jong et al. (Apr. 2003) "The Electronic Structure of n- and p-doped phenyl-capped 3,4-ethylenedioxythiophene Trimer," *J. Chem. Phys.* 118(14):6495-6502.
Kiebooms et al. (1997) "Thermal and Electromagnetic Behavior of Doped Poly(3,4-ethylenedioxythiophene) Films," *J. Phys. Chem. B* 101:11037-11039.
Kumar et al. (1998) "Conducting Poly(3,4-alkylenedioxythiophene) Derivatives as Fast Electrochromics With High Contrast Ratios," *Chem. Mater.* 10:896-902.
Lee et al. (published on Web Nov. 2001) "Supramolecular Structures from Rod-Coil Block Copolymers," *Chem. Rev.* 101:3869-3892.
Lefebvre et al. (1999) "Chemical Synthesis, Characterization, and Electrochemical Studies of Poly(3,4-ethylenedioxythiophene)/Poly(styrene-4-sulfonate) Composites," *Chem. Mater.* 11:262-268.
Li and Wang (published on Web Jan. 2004) "Synthesis and Solution Aggregation of Polystyrene-Oligo(p-pheneyleneethynylene)-Polystryene Triblock Copolymer," *Macromol.* 37:1172-1174.
McCullough, R.D. (1998). "The Chemistry of Conducting Polythiophenes," *Adv. Mater.* 10:93-116.
Odian, G. (1991) *Principles of Polymerization*, 3rd Edition, John Wiley & Sons, Inc., pp. 1.
Vogel, A.I. (1998) *Textbook of Practical Organic Chemistry*, 5th edition, reprint Longman, Singapore, pp. 557-559 and 583-585.
Wagner et al. (published on Web Jul. 2001) "Rigid-Flexible Alternating Block Copolymers That Contain Poly(p-phenylene) Units of Defined Length as the Rigid Blocks," *Macromol.* 34:5740-5743.

Head-to-tail polymerization of aniline and other asymmetric monomers forms only AB and ABA block copolymers Synthesis of ABABABA multi-block, BAB tri-block, and capped BABAB multi-block copolymers where A is the ICP block and B is the non-ICP block

POLY(HETEROAROMATIC) BLOCK COPOLYMERS WITH ELECTRICAL CONDUCTIVITY

CROSS-REFERENCE TO RELATED APPLICATIONS

This application takes priority under 35 U.S.C. 119(e) to U.S. provisional application Ser. No. 60/316,607, filed Aug. 31, 2001 which is incorporated by reference in its entirety herein.

REFERENCE TO GOVERNMENT SUPPORT

This invention was supported by the United States government under grants DMI-9960374 and DMI-0109743 from the National Science Foundation, and grant 1R43NS41686-01 from the National Institute of Health. The United States government may have certain rights in this invention.

BACKGROUND OF THE INVENTION

This invention relates to block copolymers comprising one or more blocks of a poly(heteroaromatic) polymer and two or more blocks of a non-conjugated polymer and to methods for their preparation. The poly(heteroaromatic) blocks can be either in the neutral state or in the doped state. When the blocks of the poly(heteroaromatic) polymer are in the doped state the resulting block copolymer is electrically conducting and soluble or dispersible in water, an organic solvent, or a mixture thereof. In this invention the poly (heteroaromatic) blocks are referred to as "A", while the non-conjugated blocks are referred to as "B". This invention relates to tri-block copolymers of the structure BAB, multi-block copolymers of a minimum of four blocks and structure of ABAB (or longer), and end-capped multi-block copolymers of structure BABAB (or longer).

Intrinsically conducting polymers (ICP) are polymers whose electrical and optical properties can be reversibly controlled by changing their oxidation state. Most ICPs are conjugated polymers with extended π conjugation along the molecular backbone. By chemical or electrochemical oxidation or reduction of the polymer backbone (doping) it is possible to systematically vary the electrical conductivity of these materials from the insulating state to the conducting state. In the doped (conducting) state, ICPs consist of rather rigid planar polyionic chains in which the charges are delocalized over a segment of the backbone. The chains are polycationic when they are doped through oxidation (p-doping) and polyanionic when they are doped through reduction (n-doping). Counter-ions (anions for p-doped polymers and cations for n-doped polymers) are present within the polymeric matrix to compensate for the charges on the polymer.

Representative ICPs include polyacetylene, polyaniline, polypyrrole, polythiophene, poly(phenylenesulfide), poly (paraphenylene), poly(phenylenevinylene), and many others (P. Chandrasekhar, *Conducting Polymers, Fundamental and Applications*, Kluwer Academic Publishers, Boston, 1999). Because of their extended π conjugation, conducting polymer chains behave like rigid rods, have poor flexibility, and hence do not flow or melt. Therefore, traditional melt processing cannot be employed to process these materials. Moreover, because of the strong ionic interactions among polymer chains and counterions, most conducting polymers do not dissolve in either aqueous or organic solvents and, as a result, cannot be processed from solution (Wessling B.; "Dispersion as the Key to Processing Conducting Polymers", in *Handbook of Conducting Polymers, 2$^{nd}$ Ed.*", Ed. T. A. Skotheim, R. L. Elsenbauer, J. R. Reynolds, (1998), Marcel Dekker, New York, p-471-473). The poor processability of conducting polymers is a major impediment to their commercial use.

A few exotic solvents have been discovered for some conducting polymers. For example, polyaniline doped with organic sulfonic acids is soluble in m-cresol or

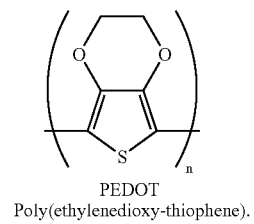

Formula 1

PEDOT
Poly(ethylenedioxy-thiophene).

hexafluoroisopropanol solutions. These solvents are toxic or expensive, and difficult to handle in a large scale process (Rasmussen P., Hopkins A., Basheer R., *Macromolecules*, 29, (1996) 7838-7846). Other conducting polymers have been stabilized as diluted dispersions in water. For example, a 1.3% aqueous dispersion of poly(3,4-ethylenedioxythiophene), PEDOT (Formula 1) doped with polystyrene sulfonic acid is commercially available from Bayer AG and is sold under the trade name of Baytron (Trademark, Bayer A G) P (L. Groenendaal, F Jonas, D. Freitag, H. Pielartzik, J. Reynolds, *Advanced Materials*, 12, (2000) 481494). Conducting polymers containing long solubilizing side-chains such as poly(3-hexylthiophene) are soluble in many common organic solvents such as chloroform, but the side chains often disrupt the conjugation and conductivity is greatly reduced, except for the case of regioregular poly(3-hexylthiophene) which has highly ordered crystal packing. Also the thermal and oxygen stability of these ICPs substituted with solubilizing chains is often much worse than the parent polymer. Finally, substituted monomers are much more expensive than unsubstituted monomers.

Francois and Olinga reported the preparation of polystyrene-polythiophene (PSt-PTh) copolymers by polymerization of thiophene or 2-bromothiophene and polystyrene chains terminated with thiophene or 2-bromothiophene groups. Soluble and insoluble fractions were recovered after synthesis. The soluble fraction was doped in solution after purification by iron chloride. The doping of the copolymer was observed by measuring the optical density of the doping band as a function of the iron chloride loading, but no conductivity data were presented for the copolymer. The copolymer was used to cast films from solution, and these films were then pyrolyzed at 380° C. to de-polymerize the polystyrene. The conductivity of the pyrolyzed films containing only the PTh, was reported to be up to 60S/cm (B. Francois, T. Olinga, *Synthetic Metals*, 55-57 (1993) 3489-3494). Frangois and others also described the synthesis of poly(paraphenylene) (PPP), polythiophene (PTh), and poly (3-hexylthiophene) block copolymers with polystyrene (PSt) or polymethylmethacrylate (PMMA) by a similar method. Although they stated that "FeCl$_3$ doped PSt-PPP copolymers" formed "exceptionally regular porous and conducting membranes", no conductivity data were reported (B. Francois, G. Widawski, M. Rawiso, B Cesar, *Synthetic Metals*, 69 (1995) 463466; R. Lazzaroni, Ph. Leclere, V.

Parente, A. Couturiaux, J. Bredas, B. Francois, *Synthetic Metals*, 102 (1999) 1279-1282).

Xue and others reported the electrochemical copolymerization of pyrrole and styrene at different feed ratios. The formation of block copolymers was reported. The products deposited as insoluble films at the electrode during synthesis, and were insoluble in both nitromethane and dichloromethane. Conductivities ranging from 0.2 to 0.007 S/cm were reported (G. Xue, S. Jin, X. Liu, W. Zhang Y. Lu, *Macromolecules*, 33, (2000) 4805-4808).

Hadziioannou and others reported the synthesis of block copolymers by regularly alternating a block of oligothiophene with a block of oligosilanylene. The oligothiophene blocks with a specific and definite number of monomer units (thiophene) were first prepared using organometallic chemistry (Ni-catalyzed Grignard coupling of mono- or di-bromothiophenes or by oxidative coupling of lithiated thiophenes). The oligothiophene blocks were then joined with thiophene terminated silanylene blocks (G. Hadziioannou, P. Hutten, R. Gill, J. Herrema; *J. Phys. Chem.*, 99, (1995) 3218-3224). Hadziioannou and others describe using the silanylene group to limit the conjugation length of conducting polymer segments as a method of controlling the luminescence wavelength. The silanylene blocks contain only one or two silicon atoms and are described solely to break the conjugation of oligothiophenes.

Leung and Ho Tan reported the synthesis of polystyrene-polyacetylene di-block copolymers obtained by thermal elimination of polystyrene-poly(phenyl vinyl sulfoxide) di-block copolymers. Conductivity of the copolymers versus compositions is reported (L. Leung, K Ho Tan, *Macromolecules*, 26, (1993) pp. 4426). Polyacetylene is a conducting polymer but not a poly(heteroaromatic) polymer.

Goodson and others reported the synthesis of rigid/flexible alternating block copolymers of PPP-PEG (poly(paraphenylene)-poly(ethylene glycol)). The copolymers were characterized by thermogravimetric analysis, differential scanning calorimetry and fluorescence spectroscopy, but no conductivity data were reported (Z. Wagner, T Roenigk, F. Goodson, *Macromolecules*, 34, (2001) 5740-5743). Goodson et al. report the formation of soluble block copolymers when the PPP segment is less than 6 repeat units long. Although PPP forms a conducting polymer, oligomers of 5 repeat units or shorter are non-conducting. Although Goodson and others report the formation of block copolymers of PPP that exhibit fluorescence behavior, they do not report the formation of conducting materials, or materials that can be rendered conducting by doping.

Cao and others reported the synthesis of ABA block copolymers of polyaniline (block A) with poly(ethyleneglycol) (PEG, block B) prepared by oxidative co-polymerization of aniline with PEG segments that had previously been reacted with p-aminobenzenesulfonyl chloride. The products were reported to be soluble in DMF, DMSO, and THF in the neutral state, but only slightly soluble in the protonated (doped) state. Conductivity of cast films ranged from 0.62 to $1.7 \times 10^{-4}$ S/cm (S. Li, H. Dong, Y. Cao, *Synthetic Metals*, 29, (1989) E329-E336).

Zhang and Bi report the synthesis of polyaniline-poly(phenylene-terephthalamide)-polyaniline tri-block copolymers by reacting low molecular weight poly(phenylene-terephthalamide) terminated with two —COCl groups with low molecular weight polyaniline, previously prepared by oxidative polymerization of aniline in HCl solution (G. Zhang, X. Bi, *Synthetic Metals*, 41-43, (1991) 251-254).

Kinlen, Frushour, Ding and Menon reported the synthesis of ABA tri-block copolymers where the A blocks are polyaniline and the B block is a α, ω-diamino terminated poly (ethyleneoxide), poly(propyleneoxide), poly(dimethylsiloxane), or poly(acrylonitrile-co-butadiene). Polymerization was performed in emulsion by oxidative coupling of aniline and the α, ω-diamino terminated B block in the presence of dinonylnaphthalenesulfonic acid. Moderately conducting ($10^{-5}$ S/cm) high molecular weight soluble copolymers were reported (P. Kinlen, B. Frushour, Y. Ding and V. Menon, *Synthetic Metals*, 101, (1999) 758-761).

Kinlen and others (WO99/16084) report the synthesis of diblock AB and triblock ABA copolymers containing intrinsically conducting blocks (A) and a non-conducting block (B) (FIG. 1, taken from the published application, illustrates the diblock and triblock copolymers). As shown in FIG. 1, diblock copolymers have one non-ICP block and one ICP-block, while triblock copolymers have one non-ICP block and two ICP blocks. The ICP blocks are formed by the polymerization of ICP monomers with the polymerization initiated at a linkage group. The non-ICP blocks have a non-ICP covalently linked with one linkage group (for diblock copolymer) or two linkage groups (for a triblock copolymer) to form a non-ICP precursor. Although the published PCT application mentions the use of ICP monomers including "pyrrole, substituted pyrroles, . . . thiophenes and substituted thiophenes, indoles, . . . furans, carbazoles and mixture thereof . . . substituted and unsubstituted anilines . . . " the only ICP monomer for which copolymer synthesis is reported is aniline and the only block copolymers exemplified are AB di-block and ABA tri-block copolymers of polyaniline (where the polyaniline block is A). No methods of preparation are provided in the reference for block copolymers containing blocks of poly(heteroaromatic) polymers such as polypyrrole, polythiophene and their derivatives.

There is a significant and continuing need in the art for conducting polymers that exhibit improved processability and mechanical and physical properties. There is a specific need in the art for processable conducting polymers formed from symmetric ICP monomers, such as those containing heteroaromatic monomers.

SUMMARY OF THE INVENTION

The present invention provides block copolymers containing at least one block of a poly(heteroaromatic) polymer and at least two blocks of a non-conjugated polymer. The chemically different blocks of the copolymer are covalently bonded to each other in an alternating fashion through an appropriate linkage group. The poly(heteroaromatic) block may exist in its neutral or oxidized form, and when in the oxidized form, it associates with organic or inorganic counter-anions to balance the charge. The poly(heteroaromatic) polymer is an intrinsically conducting polymer (ICP), and when in the oxidized form it is electrically conducting. When the ICP block or blocks of the block copolymer are in the doped form, the block copolymer is electrically conducting. Preferably the conducting block copolymers have conductivities in the range $10^{-6}$-$10^3$ S/cm. More preferably the conducting block copolymers have conductivities greater than about $10^{-3}$ S/cm. Conducting block copolymers of this invention include those having conductivities in the range of $10^{-3}$ to about $10^2$ S/cm. The block copolymers of this invention are soluble or dispersible in water, one or more organic solvents, or in a mixture thereof at a level of at least about 0.1 g/liter. More preferable soluble block copolymers of this invention are soluble in water, one or more organic solvents, or in a mixture thereof at a level sufficient to form a solution of concentration of about 1.0% weight/volume or more. More preferable dispersible block copolymers of this invention are dispersible in water, one or more organic solvents, or in a mixture thereof at a level sufficient to form a dispersion containing about 1.0% weight/volume or more of block copolymer.

The block copolymers described in this invention combine the electrical and optical properties of the ICP block with the properties of the non-conducting block, including, but not limited to solubility, processability, adhesion, substrate bonding, biodegradability, bioactivity, mechanical properties, toughness, flexibility, non-linear optical properties, ionic conductivity, compatibility with other components, fillers or substrates, among others.

The conducting blocks of the block copolymers of this invention must be of sufficient length to be conducting and must be present in sufficiently high concentration to allow bulk conducting percolation in the solid state. In preferred embodiments the block copolymers of this invention contain conducting blocks having 3 or more monomers, particularly 3 or more heteroaromatic monomers. In a more preferred embodiment the conducting blocks contain at least 8 heteroaromatic units.

The present invention also provides block copolymers formed by at least one block of a poly(heteroaromatic) polymer and at least two blocks of a non-conjugated polymer in which the non-conjugated polymer contains one or more latent polymerizable groups that undergo polymerization under selected conditions, during or after the formation of the block copolymer, to cross-link the block copolymer into a polymeric network.

The present invention also provides a method for the preparation of such block copolymers comprising a first step in which a non-conducting block of appropriate molecular weight is modified with one or two linkage groups that undergo oxidative polymerization, and a second step in which the modified non-conducting block is copolymerized with a heteroaromatic monomer under oxidative conditions to form a tri- or a multi-block copolymer. Tri-block copolymers are formed using non-conducting blocks that have one linkage group, while multi-block copolymers are formed using non-conducting blocks that have two linkage groups. Tri-block copolymers are BAB type, while multi-block copolymers contain a minimum of 4 blocks (e.g. ABAB).

DETAILED DESCRIPTION OF THE INVENTION

An important concept of the present invention is that continuous conjugation along the molecular backbone is not required to have macroscopic electrical conductivity, rather the conducting blocks must be of sufficient length to be conducting and must be present in sufficiently high concentration to allow bulk conducting percolation of the dry material. It has been demonstrated that the conductivity of composite materials containing a conducting component and a non-conducting component is not linear with the volume fraction of the conducting component but follows a sigmoidal function. This has been explained in terms of percolation theory (Wessling B.; "Dispersion as the key to Processing Conducting Polymers", in *Handbook of Conducting Polymers, $2^{nd}$ Ed.*", Ed. T. A. Skotheim, R. L. Elsenbauer, J. R. Reynolds, (1998), Marcel Dekker, New York, p-471-473). Below a critical concentration (percolation threshold) of the conducting component, the composite material is an insulator. Around the critical concentration, a small increase in the conducting component's concentration increases the conductivity by several orders of magnitude. Above the critical concentration, the addition of conducting material brings only a slight further increase in conductivity.

This invention provides block copolymers containing conducting and non-conducting blocks, which combine the desired conductivity with significantly improved processability and mechanical properties. The block copolymers of this invention are prepared by polymerization of ICP blocks having heteroaromatic monomers and non-conducting blocks of various chemical structures.

Figure 1:
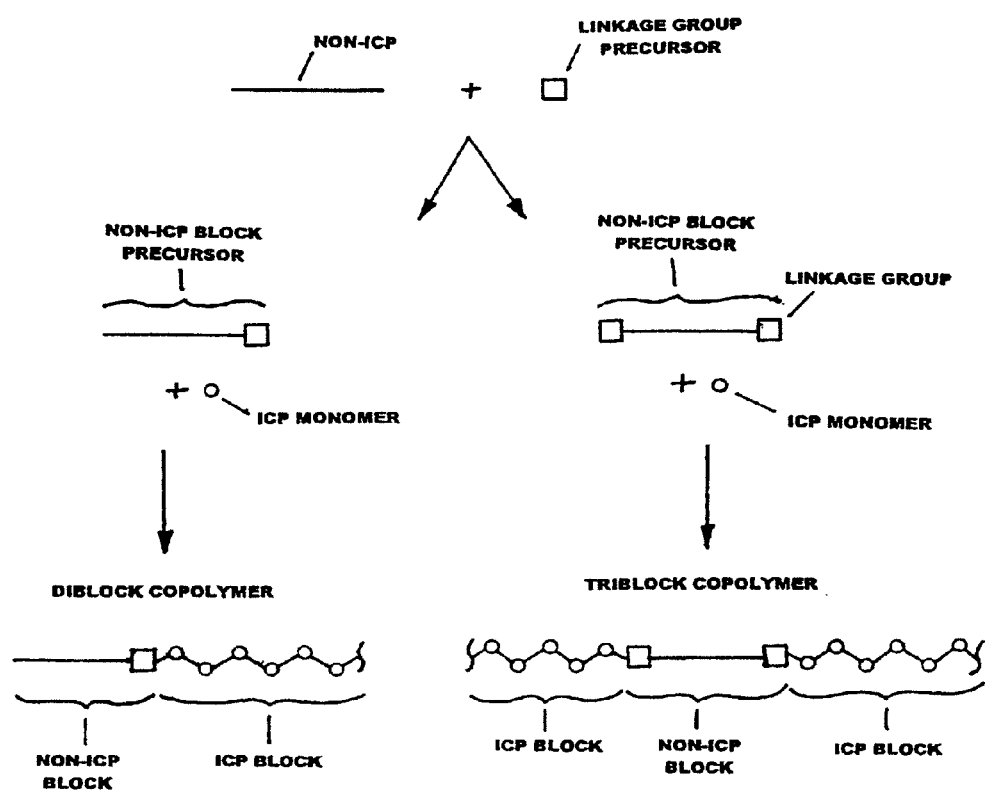
FIG. 1 illustrates the structure of di-block and tri-block copolymers from Kinlen et al. WO99/16084.
Figure 2:
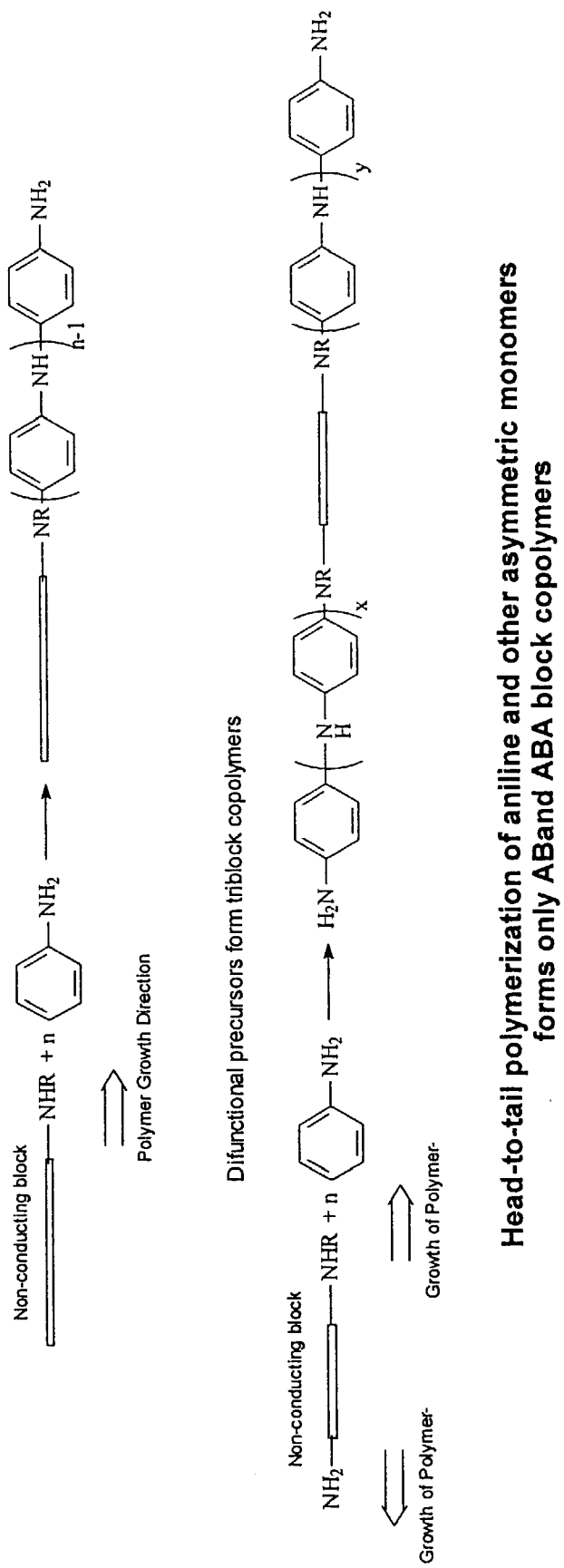
FIG. 2 illustrates head-to-tail polymerization of aniline and other asymmetric monomers to forms only AB and ABA block copolymers
Figure 3:
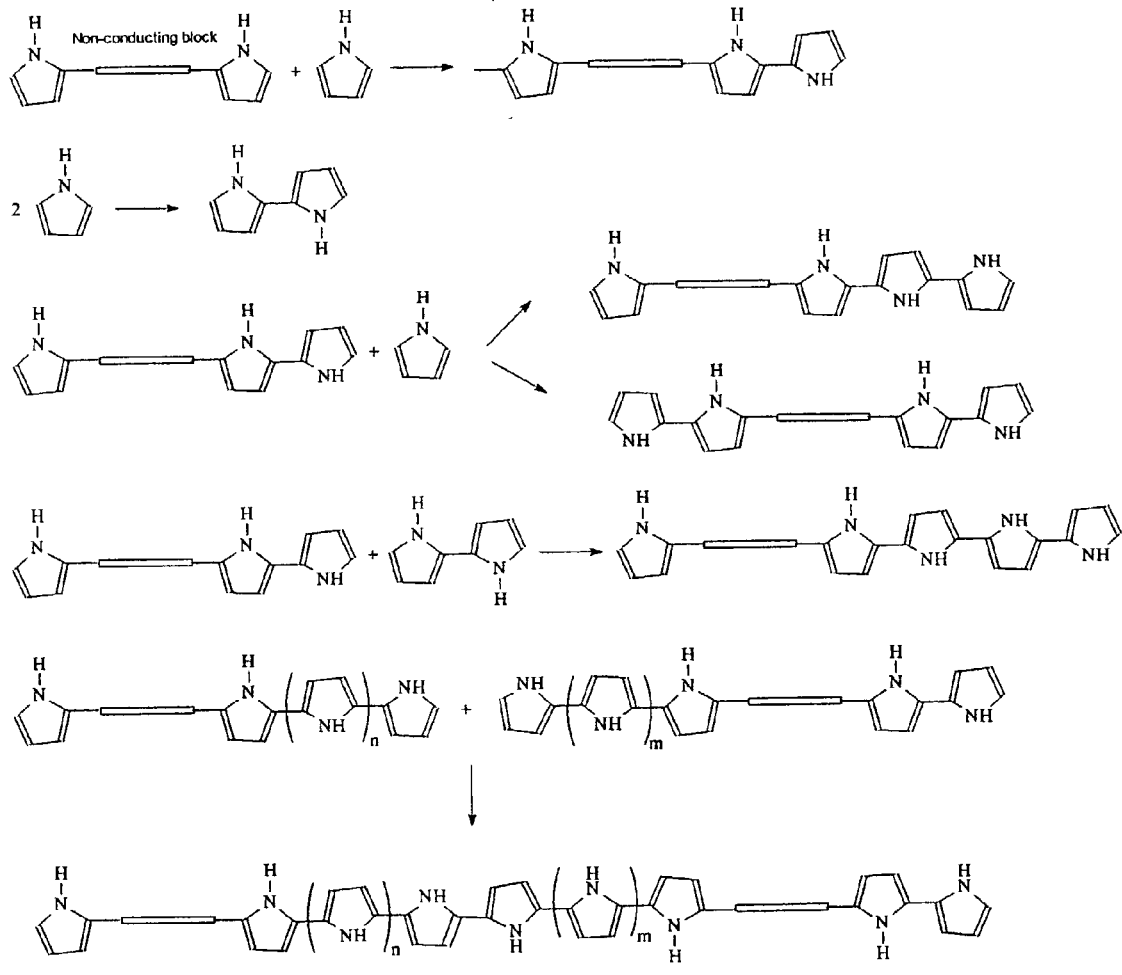
FIG. 3 illustrates the polymerization of pyrrole, thiophene, and their derivatives by random coupling of radical cations to form multi-block ABABAB.
Figure 4:
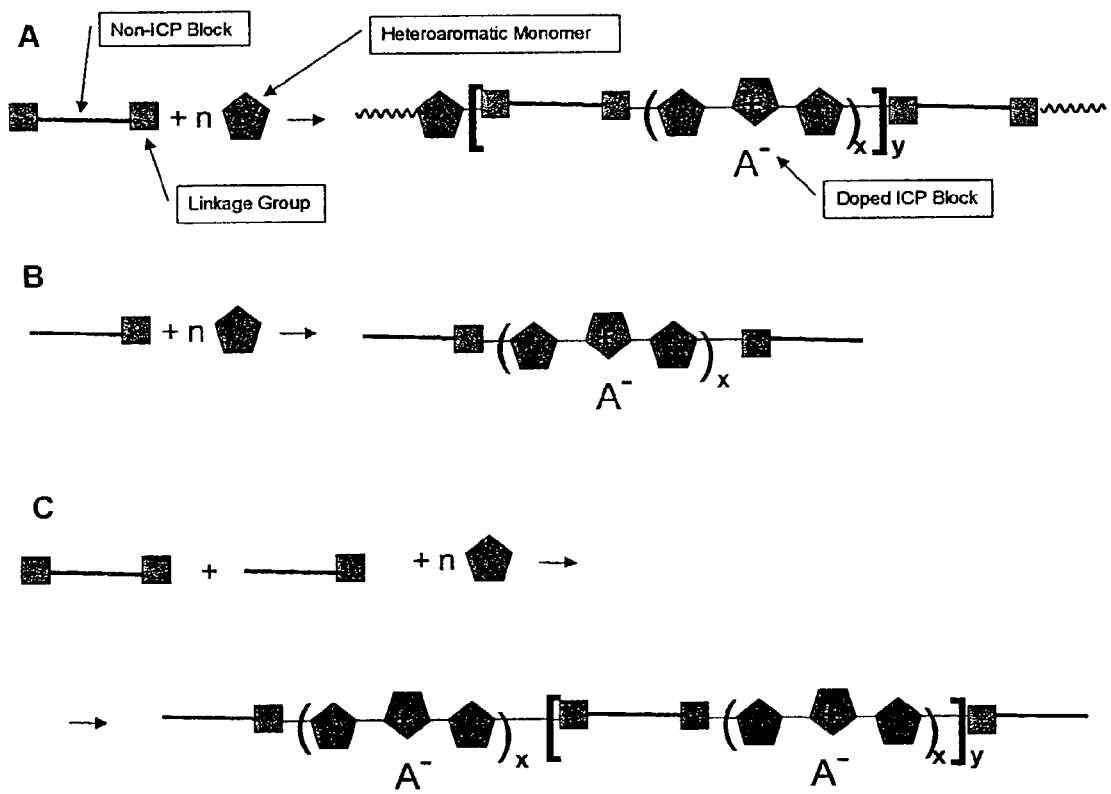
FIG. 4 illustrates synthesis of ABABABA multi-block, BAB tri-block, and capped BABAB multi-block copolymers (where A is the ICP block and B is the non-ICP block)

There are major differences among ICP monomers in their mechanisms of polymerization. Aniline is an asymmetric monomer that polymerizes head-to-tail (i.e. the $NH_2$ group reacts with the carbon in the para position to the benzene ring of another molecule). This implies that the polyaniline block, once it has started to grow (polymerize) at the linkage group on the non-ICP block, can grow only in one direction until all the monomer is consumed. No coupling of growing segments can occur because this would require the reaction of a $NH_2$ group with another $NH_2$ (as shown in FIG. 2). In contrast, pyrrole, thiophene, furan, other five member heteroaromatic monomers, and their derivatives are symmetric monomers. Polymerization occurs with these ICP monomers by random coupling of radical cations that form by oxidation of neutral precursor species, including the ICP monomer, its dimer, its trimer, a section of the ICP polymer or a growing ICP segment on the non-ICP block. Because of this random coupling of species, multi-block copolymers of the type ABABABAB are obtained from non-ICP blocks with two linkage groups, and tri-block copolymers of the type BAB are obtained from non-ICP blocks terminated with a single linkage group (where A is the conducting block, and B is the non-ICP block, as shown in FIG. 3 and FIG. 4).

Because of the substantial difference in the polymerization of asymmetric monomers such as aniline and symmetric heteroaromatic monomers such as pyrrole and thiophene, methods previously exemplified (Kinlen (WO99/16084) for the polymerization of asymmetric monomers are not applicable to polymerization of the symmetric heteroaromatic monomers of the present invention.

The differences in formation of block copolymers of symmetric and asymmetric ICP are illustrated in FIGS. 4A, 4B and 4C:

a) when starting from a non-ICP block (B) with two linkage groups a triblock copolymer of the type ABA is formed if using aniline or another asymmetric monomer that polymerizes head-to tail by the method described by Kinlen, but a multiblock copolymer of the type ABABABAB is obtained when following the method of the present invention with a symmetric heteroaromatic monomer (FIG. 4A);

b) when starting from a non-ICP block (B) with one linkage group a diblock copolymer of the type AB is formed if using aniline or another asymmetric monomer that polymerizes head-to tail by the method described by Kinlen, but a triblock copolymer of the type BAB is obtained when following the method of the present invention with a symmetric heteroaromatic monomer (FIG. 4B).

c) when using a mixture of mono and difunctional non-ICP blocks, a capped multiblock copolymer of definite molecular weight can be prepared using the present invention (FIG. 4C).

Therefore, the block copolymers of this invention contain two or more non-ICP blocks, while the copolymers described by Kinlen always contain only one non-ICP block. Kinlen's copolymers are prepared from monomers that polymerize head to-tail while copolymers of this invention are prepared from symmetric heteroaromatic monomers.

DEFINITIONS

A heteroaromatic monomer is an aromatic compound containing a heteroatom in the conjugated ring system and is isoelectronic with the original aromatic hydrocarbon (F. Carey, R. Sundberg, *Advanced Organic Chemistry, Third Ed., Part A*, Plenum Press, New York (1990) p. 531). Atoms other than a carbon (heteroatoms) include nitrogen, sulfur, oxygen, selenium and tellurium. Heteroaromatic monomers comprise pyrroles, thiophenes, selenophenes tellurophenes, furans, indoles, isoinoles, isothianaphthalenes, pyridines, pyrimidines, pyrazines, triazines, thiazoles, imidazoles, quinolines, isoquinolines, benzimidazoles, thiazoles, triazoles, oxidiazoles, benzopyrrolines, dithienobenzene, thianaphthene, carbazoles, benzothiophenes, isobenzothiophenes, benzofurans, isobenzofurans, isoindolines, isobenzoselenophenes isobenzotellurophenes, their substituted derivatives, or mixtures thereof.

Some heteroaromatic monomers of this invention are illustrated in Formula 2.

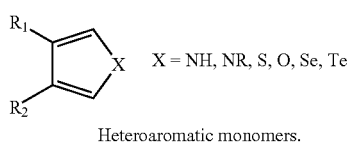

Formula 2

X = NH, NR, S, O, Se, Te

Heteroaromatic monomers.

where R, $R_1$ or $R_2$ are selected independently of one another and may be the same or different groups including hydrogen, deuterium, halogens, alkyl, fluoroalkyl, halogenated alkyl, alkenyl, alkoxy, carboxylate, alkylcarbonyl, akanoyl, alkylthio, mercapto, cycloalkoxy, alkenyldioxy, aryl, alkylaryl, arylalkyl, aryloxy, amino, alkylamino, dialkylamino, alkylcarbonylamino, alkylsulfinyl, aryloxyalkyl, alkoxylalkyl, polyetheralkyl, phosphate, phosphite, phosphine, hydroxyl, cyano, sulfonate, alkylsulfonate, arylsulfonate, alkylsulfate, arylsulfate, nitro, alkylsilane, arylsilane, or $R_1$ and $R_2$ together form an alkylene, alkenylene, alkenyloxy, alkenyidioxy, alkynyloxy, alkynyldioxy chain that completes a 3,4,5,6, 7 or 8 membered alicyclic or aromatic ring which can optionally include one or more heteroatom including nitrogen, oxygen, sulfur, phosphorous, selenium, tellurium, or silicon. R, $R_1$ or $R_2$ can also be an oligomeric or polymeric chain made by repeating one or more monomers, including among others glycols, ethers, fluoroethers, olefins, fluoroolefins, acrylates and methacrylates, vinyl compounds, alkynes, esters, amino acids, lactones and lactams, polyols, urethanes, epoxies, hydroxyacids, dienes, polyenes, chloroolefins, diols, diamines, and polyamines.

The poly(heteroaromatic) blocks comprise polymers made by polymerization of one or more heteroaromatic monomers listed above. The conducting sections of the conducting block copolymers of this invention preferably have 3 or more polymerized monomers (n=3 or more in certain formulas herein). In more preferred embodiments, the conducting sections have 8 or more repeating units (i.e., monomer units). Block copolymers of this invention also include those having from 5 to about 500 monomers, those having 5 to about 100 monomer units and those having 5 to about 50 monomer units. In each case the conducting sections can contain one or more different monomer units but preferred block copolymers have conduction sections in which all of the monomers are the same. Conducting blocks containing one or more selected heteroaromatic monomers can be combined by the methods herein to form block copolymers with conducting blocks that contain one or more different selected heteroaromatic monomer.

The non-conducting sections of the block copolymers of this invention include, among others, polyethers, poly(fluoroethers), polyglycols, polyactals, polyolefins, polystyrene and its copolymers, polyfluoroolefins, polyoxides, polychloroolefins, polychlorofluoroolefins, polysiloxanes, polyesters, polybromoesters, natural and synthetic rubbers (vulcanized or un-vulcanized), polyacids, polycarbonates, polyanhydrides, polysulfides, polyamides, polyamines, polyimides, vinyl polymers and polymers derived from the polymerization of unsaturated monomers, polyacrylates and polymethacrylates, polyacrylonitriles and its copolymers, polybutadiene and its copolymers, alkyds, polyalcohols, polyurethanes, epoxies, cellulose and its derivatives, starch and its derivatives, other natural occurring polymers, polypeptides, and other biomolecules and combinations and copolymers thereof.

The average molecular weight of the block copolymer preferably ranges from 40 Daltons to about 1 million Daltons. In more preferred embodiments the non-conducting blocks (B) of the block copolymers of this invention contain 1 to about 100 repeating units and the conducting block/s (A) contain 3 to about 500 repeating units.

The non-conducting block is modified at one end or at both ends with a linkage group (L1 and L2 in Formulas 3-9) that undergoes oxidation under the conditions used to polymerize the heteroaromatic monomer. Linkage groups include among others aliphatic acids, aromatic amino groups, phenols, substituted thiophenes, pyrroles, furan species and their derivatives, carbonyl compounds, quinones, halogenated compounds, acetylenes, phosphorous containing compounds, thiols, and other species that undergo oxidation.

The linkage group is bonded to the non-conducting polymer during the first step of the synthesis, preferably through a covalent bond. The covalent bond between the non-conducting block and the linkage group may be an ester, thioester, amide, ether, thioether, amino, carbon-carbon, sulfonic ester, sulfonamide, phosphate ester, anhydride, urea, urethane, carbonate, imine, imide, thiocarbonate, thiourethane or thiourea linkage.

The modified non-conducting block (with one or more terminal linkage groups) is then copolymerized with one or more heteroaromatic monomers (second step of the synthesis). Copolymerization occurs by chemical or electrochemical oxidation of the monomers.

Preferred block copolymers of this invention are soluble or dispersible in selected solvents to facilitate processing of the copolymers. A material is soluble in a solvent or solvent mixture if it substantially dissolves in that solvent or solvent mixture at a level of at least about 0.1 g/L at room temperature. As used herein the term soluble encompasses materials where small amounts of the material may not dissolve in the selected solvent, but wherein the amount of material that does not dissolve does not significantly interfere with processability of the material or the use or application of the solution. A fully dispersible material is a material that forms a stable suspension of droplets, micelles, or colloidal particles in a liquid medium such as water, an organic solvent or a mixture thereof at a concentration of at least 0.1 g/L. The droplets, micelles or colloidal particles are stable under the force of gravity and the dispersed material does not precipitate or separate out of the liquid medium over a time period that significantly interferes with the use of the dispersed material. Preferably the material does not precipitate or separate out of the liquid medium within a one-month period after the dispersion is formed. A material is dispersible in a liquid medium if it substantially disperses. As used herein—the term "dispersible" encompasses materials where small amounts of the material may not disperse in the selected liquid medium, but wherein the amount of material that does not disperse does not significantly interfere with processability of the material or the use or application of the dispersion.

In specific embodiments the block copolymers of this invention have the structures in Formulas 3-6:

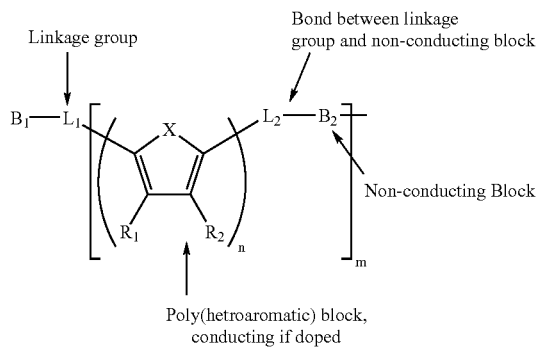

Formula 3 where variables are defined above, $B_1$ and $B_2$ are the non-conducting blocks and can be the same or different and are independently described by B above, and $L_1$ and $L_2$ which may be the same or different are optional suitable linkage groups linked with a suitable covalent bond to the non-conducting blocks $B_1$ and $B_2$, and $n \geq 3$ and $m \geq 1$. In particular, the block copolymer includes the structures shown in Formulas 4, 5 and 6:

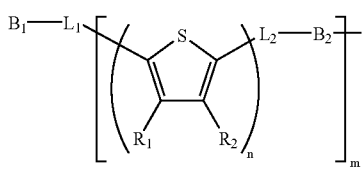

Formula 4

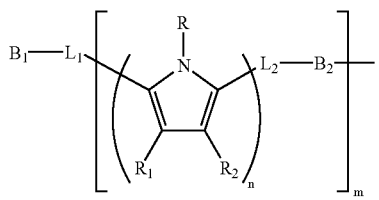

Formula 5

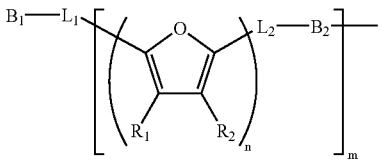

Formula 6 where variables are as defined above.

Suitable linkage groups are illustrated in the examples herein and include among others pyrrole and thiophene derivatives. Suitable bonds between the linkage groups and the non-conducting block include single bonds, e.g., —CO—, —CO$_2$—, —CO$_2$—CH$_2$—, —NH—, and —CONH— groups among others.

Block copolymers of this invention also include those having the formulas 7, 8 and 9) where A, A1 and A2 can be the same or different heteroaromatic monomers as defined above for A, L1 and L2 are optional linkage groups which may be the same or different and l, n, m, x, and y are integers that represent the number of repeating monomer units in the block, T1 and T2 represent a end-cap of the non conducting block that does not undergo oxidation:

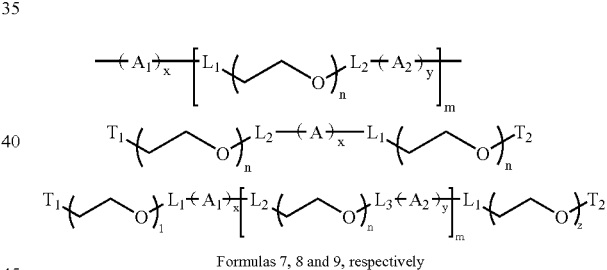

Formulas 7, 8 and 9, respectively

Chemical polymerization can be performed in the presence of an oxidizing agent comprising one or more of the following: hydrogen peroxide; organic or inorganic peroxides; persulfates; peracids; peroxyacids; hypobromite; bromates; hypochlorite; chlorates; perchlorates; periodates; organic or inorganic salts of iron (III), chromium (IV), chromium (VI), manganese (VII), manganese (V), manganese (IV), vanadium (V), osmium (VIII), ruthenium (IV), mercury (II), copper (II), lead (IV), molybdenum (VI); gasses such as oxygen, ozone, chlorine, bromine, SO$_2$, SO$_3$, NO$_2$; organic oxidants such as formic acid, oxalic acid, oxalyl chloride, acetic anhydride, trifluoroacetic anhydride, and substituted or unsubstituted quinones. The polymerization reaction is carried out in a solvent or mixture of solvents which can include water, alcohols, glycols, alkoxyalcohols, ketones, esters, linear and cyclic ethers, alkoxyethers, chlorinated solvents, carbonates, nitriles, amides, sulfoxides, hydrocarbon and aromatic solvents and mixtures thereof. The polymerization is typically carried out at a temperature between −80° C. and the boiling point of the solvent used. Polymerization conditions can be controlled to control the size of polymers formed as is known in the art. Polymerization may be carried out in the presence of an organic or inorganic acid or salts, thereof.

Preferred heteroaromatic monomers are pyrrole and thiophene and derivatives thereof, particularly those derivatives carrying substituents in position 3 or in positions 3 and 4 on the aromatic ring. Substituents have been defined above. Especially preferred heteroaromatic monomers are pyrrole, N-methylpyrrole, N-alkylpyrrole, 3-methylpyrrole, 3-methoxypyrrole, thiophene, 3-methylthiophene, 3-hexylthiophene, 3-octylthiophene, 3-methoxythiophene, 3,4-ethylenedioxythiophene, 3,4-propylenedioxythiophene, 3,4-butylenedioxythiophene, 3,4-ethylenedioxypyrrole, and 3,4-propylenedioxypyrrole.

Preferred non-conducting blocks are poly(ethylene glycol)s, poly(propylene glycol)s, acrylonitrile-butadiene copolymers, poly(dimethylsiloxane)s, polyesters, other polyols, and polyalcohols. Preferred molecular weight of the non-conducting block ranges from 100 to 3000 Daltons. Preferred linkage groups are pyrrole, thiophene, and 3,4-ethylendioxythiophene. These linkage groups are preferably bonded to the non-conducting block in position 2 through an ester, amide, sulfonamide, sulfonic esters, ether, or carbon-carbon bond.

The non-conducting B blocks of the block copolymers of this invention may contain one or more latent polymerizable groups for further reaction or crosslinking. Latent polymerizable groups include acrylates, methacrylates, vinyl esters, vinyl ethers, olefins, and substituted olefins, isocyanates, thioisocyanates, nitriles, epoxy groups, alkids, alkoxysilanes, vinylsilanes, amino, hydroxyl, thiol, carboxy, anhydrides, phenols, aldehydes, furans, melamine, unsaturated polyesters, cyanate esters, cyano acrylates, acetylenes, esters, amides, lactones and lactams.

In preferred embodiments, block copolymers containing latent polymerizable groups are of the type BAB where the latent polymerizable group is at the free or distal end of the B block. Preferred polymerizable groups include acrylates and methacrylates that can be cross-linked by radical polymerization in the presence of radical initiators such as redox initiators, peroxides, azo compounds or photoinitiators.

Preferred chemistries for the first step of the synthesis (functionalization of the non-conducting block with a linkage group that undergoes oxidation) are:
1) Formation of an ester bond by reacting a hydroxy-terminated non-conducting segment with 2-thiophenecarbonyl chloride or N-metyl-2-pyrrolecarbonyl chloride (see Examples 1-7 and 10-14).
2) Formation of an ether bond between a thienylmethanol unit and the non-conducting block following the Williamson reaction, Vogel A. I. "Textbook of Practical Organic Chemistry" 5$^{th}$ Ed., 1998 reprint Longman, Singapore p. 583-585; Freedman H. H. and R. A. Dubois (1975) *Tetrahedron Letters*, 3251).
3) Formation of a carbon-carbon bond by reacting an organometallic reagent such as thienyllithium with a di-chloro or di-bromo terminated non-ICP block or a diglycidyl-terminated non-ICP block (Example # 9 A, Vogel A. I. "Textbook of Practical Organic Chemistry" 5$^{th}$ Ed., 1998 reprint Longman, Singapore, p. 557-559). An EDOT-terminated macromonomer can be prepared following the same method: 3,4-ethylenedioxythiophene is first lithiated with butyl lithium or methyl lithium (Rajappa S. (1984) "Thiophenes and Their Benzoderivatives: (ii) Reactivity" in *Comprehensive Heterocyclic Chemistry*, C Bird, and G. Cheeseman Editors, Pergamon Press, Oxford, p. 771), and then reacted with the di-chloride of the soft segment or with a poly(ethylene glycol) diglycidyl ether (Example 17).
4) Formation of sulphonamides and sulfonate esters by reacting thienylsulphonyl chloride with a diol or a diamine (Examples 8).
5) Reductive amination of thiophene carboxyaldheyde, pyrrole carboxyaldehyde, or EDOT carboxyaldehyde (Examples 15, 18, and 19).

The copolymerization reaction (step two of the synthesis) is preferably carried out with molecular oxygen, ozone, a peroxide, hydrogen peroxide, a persulfate or an iron(III) salt. Preferably an organic acid or its salt is present during the polymerization. Preferred organic acids include para-toluenesulfonic acid, dodecylbenzenesulfonic acid, poly(styrenesulfonic acid), di-nonylnaphthalenesulfonic acid, and mono- and dialkyl sulfosuccinates. Preferred solvents for the copolymerization are water, butanol, pentanol, ethoxyethanol, butoxyethanol, THF, acetone, methylethylketone, nitromethane, and mixture thereof. Preferred reaction temperature is between −20° C. and 80° C.

EXAMPLES

Example 1

Synthesis of poly(EDOT-block-EG 400) (ABAB multi-block or Larger)

Poly(EDOT-block-EG 400) (a multi-block copolymer of ethylenedioxythiophene (EDOT) and ethylene glycol (EG) having poly(ethylene glycol) (PEG) segments of MW=400) was prepared in a two-step synthesis following the strategy illustrated below: a PEG segment having average molecular weight of 400 was first capped with two thiophene units to form the macromonomer poly(ethylene glycol)dithiophene (PEGdTh, step A), then the PEGdTh was copolymerized with EDOT in the presence of iron (III) para-toluenesulfonate (Fe(pTS)$_3$) (step B).

Step A:

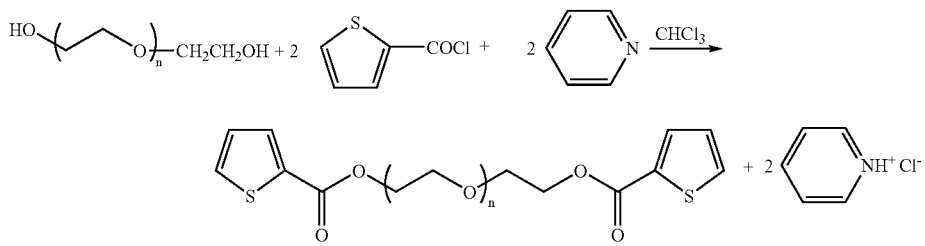

-continued

Step B:

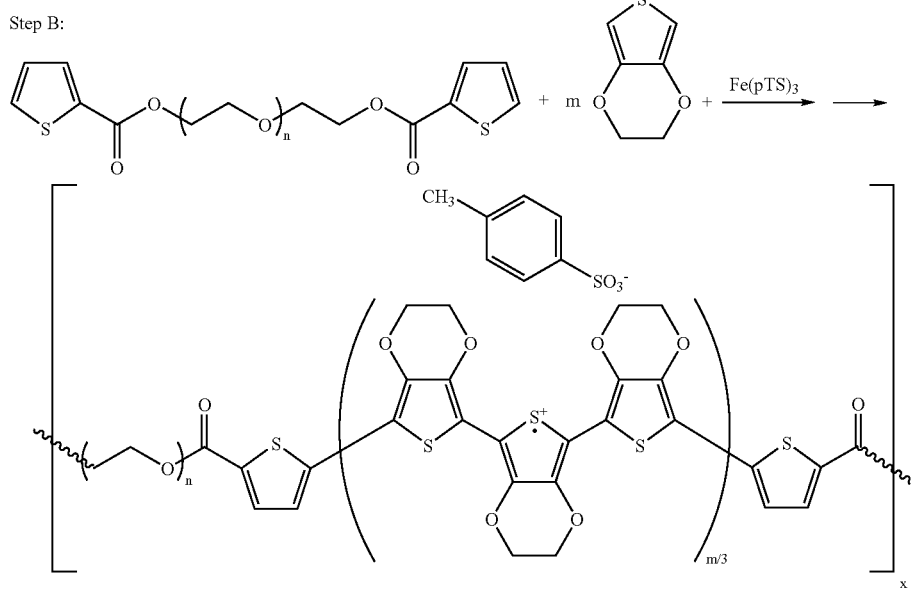

Step A: Synthesis of Thiophene-capped PEG Blocks (PEGdTh)

2-Thiophenecarbonyl-chloride (7.06 mL, 66 mmol=2.2 eq.) was added at 0° C. to PEG (400) (Aldrich, 12 g=30 mmol=1 eq.) and pyridine (5.73 mL, 70 mmol) in $CH_2Cl_2$. Pyridinium hydrochloride formed as the solution was warmed to room temperature. After cooling, the pyridinium hydrochloride was removed by filtration and the filtrate was washed 3 times with dilute HCl (to remove excess pyridine) and $NaHCO_3$ (to remove excess 2-thiophene carbonyl chloride and/or its hydrolysis product, 2-thiophene carboxylic acid). A $^1$H NMR spectrum of this material indicated that the major species was the desired product. The yield of the reaction was calculated by comparing the peak integrals of the thiophenic protons with the peak integrals of the α $CH_2$ of the PEG. The yield was near quantitative on the PEG used.

Step B: Synthesis of Poly(Edot-Block-EG 400)

PEGdTh (400) (0.64 mmol) was dissolved in n-butanol (0.5 ml), mixed with 32.4 g of Baytron® C from Bayer (50% wt. $Fe(pTS)_3$ in butanol, =23 mmol of iron), and heated under stirring to 80° C. Freshly distilled ethylenedioxythiophene (EDOT from Bayer; 1.6 g=11.3 mmol) was dissolved in 120 ml of n-butanol (final concentration of $10^{-2}$ M) and slowly added to the hot mixture of PEGdTh and Baytron® C over a 1.5 hr period under stirring. After the addition was completed, the reaction was kept at 80° C. for 1.5 hr, then cooled to room temperature and stored overnight. The following day the solution was dark blue and no precipitate was present.

The crude mixture was filtered and extracted two times with water. The water phase was yellow in color and had a pH of 1-2. The dark blue butanol phase containing the conducting copolymer had a pH of 2-3 and was used to prepare thin films on polycarbonate. This solution was analyzed by gel permeation chromatography (GPC) and its residue after evaporation of the butanol was characterized by elemental analysis. GPC experiments were conducted using a Phenogel 00H-3259-KO column connected to a Waters HPLC system. Tetrahydrofuran was used as the mobile phase at an operating flow rate of 1 ml/min. The copolymers were injected as solution in butanol and a UV-Vis detector was used to monitor their presence in the eluent at a wavelength of 330 nm, which is above the absorbance of both butanol and THF. Poly(EDOT-block-EG 400) has a very broad molecular weight distribution that is centered between 10,000 and 20,000 daltons. Elemental analysis of a dry sample was performed at Huffman Laboratories in Golden, Colo. and the results are shown in Table 1. A thin film of poly(EDOT-block-EG 400) coated on polycarbonate sheets from the butanol solution is optically clear. The electrical bulk conductivity of this thin film measured by the "four-point conductivity method" (P. Chandrasekhar, *Conducting Polymers, Fundamental and Applications*, Kluwer Academic Publishers, Boston, 1999) was 480 S/cm (±50%).

TABLE 1

| Elemental Analysis of Poly (EDOT-block-EG 400) | |
|---|---|
| Element | Weight % |
| C | 45.56 |
| H | 4.71 |
| O | 28.69 |
| S | 16.04 |
| Fe | 5.53 |
| Total | 100.5 |

Alternative Step B: Synthesis of Poly(EDOT-Block-EG 400)

In a glass flask 0.5 ml of butanol, 0.233 g of PEGdTh (400) and 32.48 g Baytron® C (50% butanol, 50% Iron (III) paratoluenesulfonate) are mixed together and heated to 80° C. Using an addition funnel, a solution of 10 ml butanol and 1.6 g distilled Baytron® M (EDOT) was added drop-wise over a three-hour period. The reaction was allowed to proceed for 24 hours at 80° C. A dark thick blue solution formed together with some precipitate. The product was then filtered and the filtrate extracted over water in a separatory funnel two times with water and two times with brine. Films were cast on glass plates with this solution were green/blue after drying and poorly conducting.

Example 2

Synthesis of poly(EDOT-block-EG 600) and poly(EDOT-block-EG 1500) (ABAB multi-block or Larger)

Poly(EDOT-block-EG 600) and poly(EDOT-block-EG 1500) were synthesized following the strategy in Example # 1 from PEG oligomers with molecular weights of 600 or 1500. 2-Thiophenecarbonyl-chloride (8.8 mL, 82 mmol=2.2 eq.) was added to PEG (600) or PEG (1500) (1 eq.) and pyridine in dry $CHCl_3$ and refluxed overnight. The solvent was removed by vacuum distillation using a rotary evaporator and the residue was re-dissolved in hot $CH_2Cl_2$. After cooling, the pyridinium hydrochloride precipitated and it was removed by filtration. The filtrate was washed 3 times with dilute HCl to remove excess pyridine, and with $NaHCO_3$ to remove pyridinium hydrochloride and any potential 2-thiophene carbonyl chloride and/or its hydrolysis product, 2-thiophenecarboxylic acid. Positive confirmation of the formation of the desired product PEGdTh was obtained by $^1H$ NMR and FT-IR analysis. The yield of each reaction was obtained by comparing the intensity of the thiophenic protons with the intensity of the α and β methylene protons of the PEG section. The $^1H$ NMR of the PEGdThs (600) showed complete conversion and no impurity was present in the product. The $^1H$ NMR of the PEGdThs (1500) showed the presence of an impurity in the aromatic region. It was purified by recrystallization from hot ethanol to a white amorphous solid that gels slightly when warmed to room temperature.

The copolymerization of PEGdTh (600) with EDOT was performed as follows: PEGdTh (600) (0.46 g=0.64 mmol) was dissolved in n-butanol (0.5 ml), mixed with 32.4 g of Baytron® C (50% wt. $Fe(pTS)_3$ in butanol, =23 mmol of iron), and heated under stirring to 80° C. In an addition funnel freshly distilled EDOT (1.6 g=11.3 mmol) was dissolved in 120 ml of n-butanol (final concentration of $10^{-2}$ M). The EDOT solution was slowly added to the hot mixture of PEGdTh and Baytron® C over a 3 hr period under stirring, and turned dark blue in color. After the addition was completed the reaction was cooled to room temperature and stored overnight. The following day the solution was dark blue and no precipitate was present. The crude mixture was filtered and extracted two times with water. The water phase was

TABLE 2

Elemental Analysis of Poly(EDOT-block-EG)s (Weight %).

|   | Poly(EDOT-block-EG 600) | Poly(EDOT-block-EG 1500) |
|---|---|---|
| C | 44.74 | 45.96 |
| H | 5.74 | 5.08 |
| O | 30.97 | 29.29 |
| S | 14.14 | 14.78 |
| Fe | 5.52 | 5.66 |
| Total | 101.2 | 100.8 | yellow in color and had a pH of 1-2. The dark blue butanol phase had a pH of 2-3 and was used to prepare thin films on polycarbonate.

A similar copolymerization was performed starting from PEGdTh (1500). A dark blue solution with no precipitate was obtained. This solution was used to coat polycarbonate sheets.

Both films of poly(EDOT-block-EG 600) and poly(EDOT-block-EG 1500) were optically clear and electrically conducting. The electrical bulk conductivity of a thin film of poly(EDOT-block-EG 600) measured by the "four-point conductivity method" was 2.2 S/cm (±1 S/cm), while the conductivity of a thin film of poly(EDOT-block-EG 1500) was 0.5 S/cm (±0.2 S/cm). The elemental analysis of these two copolymers is shown in Table 2.

Alternative Step B: Synthesis of Poly(EDOT-Block-EG 1500)

In a 100 mL round-bottom flask, a mixture of PEGdTh (1500) (0.116 g) and Baytron C (16.21 g) were heated to 80° C. with stirring. To the heated mixture, a solution of 0.805 g of Baytron M in 5 mL of n-butanol was added dropwise over 35 minutes. After the addition, the heater was switched off and the reaction mixture was left stirring at room temperature for 7 days. A thick blue-green solution was obtained. The solution was then filtered but no residue was collected. The sample was then extracted with an excess (10 times the organic phase) of water. Because water did not separate from the butanol phase, NaCl was added. The extracted deep-blue organic phase was used to coat a polycarbonate sheet with a hand coater. The resulting coating was conductive. No precipitate was present after storing the deep-blue solution for two months. A portion of the solution was gently dried at r.t. in a vented chamber. A pressed pellet made from the dry powder had a conductivity of 0.1 S/cm as determined with a Jandel four-point conductivity probe.

Alternative Step B: Synthesis of Poly(EDOT-Block-EG 1500)

PEGdTh (1500) (1.25 g, 0.343 mmol=1/40 eq) was mixed with para-toluene sulfonic acid (7.59 g, 39.1 mmol=1.35 eq), dodecylbenzene sulfonic acid (18.34 g, 39.1 mmol=1.35 eq), ammonium persulfate (6.78 g, 29.1 mmol=1 eq), and iron(III) sulfate (0.047 g, 0.092 mmol=0.003 eq) in 100 mL of DI water. EDOT (3.10 mL, 29.1 mmol=1 eq) was mixed with 200 mL of 1-butanol and added dropwise to the PEGdTh (1500) solution. The addition took approximately 4 hours. Upon the addition of EDOT/butanol, the solution went from clear yellow to cloudy gray then finally black. The resulting solution was stirred at room temperature for approximately 24 hours before work-up. After 24 hours, the organic layer was washed with water 3 times, then 2 times with concentrated sodium chloride solution, and 2 more times with DI water. The volume of water or sodium chloride solution used was 1/3 of the volume of the organic layer present. A portion of the organic solution was gently dried in a vented oven and pressed to form a pellet that had conductivity of $2.3 \times 10^{-3}$ S/cm.

Example 3

PEG(550)monothiophene-co-EDOT (BAB tri-block Copolymer)

Polyethylene glycol (550) monomethyl ether was reacted with 2-thiophenecarbonyl-chloride following the recipe in Example #1 to form a mono-methoxy mono-thiophene poly (ethylene glycol). This compound was copolymerized with 3,4-ethylenedioxythiophene to form a BAB tri-block copolymer.

In a round bottomed flask, 0.37 g of PEG(550)monomethoxy mono-thiophene (0.563 mmol), 0.5 mL butanol and 32.48 g Baytron® C (50 wt % solution of iron(III) tosylate in butanol) were combined and heated to 80° C. A solution of 1.6 g of EDOT (11.26 mmol) and 112 mL n-butanol was added drop-wise. The solution was held at 80° C. under constant stirring for 3 hours and cooled overnight. After 24 hours the solution was washed twice over water. Gel Permeation Chromatography confirmed the formation of compounds with molecular weights from 2,000 to 10,000 daltons.

Example 4

Methacrylated BAB tri-block Copolymer

Step A: Synthesis of Thiophene/Methacrylate Compound.

This molecule is used as the "B" block to make a BAB type block copolymer and it contains a latent polymerizable group (the methacrylate) for further reaction or cross-linking.

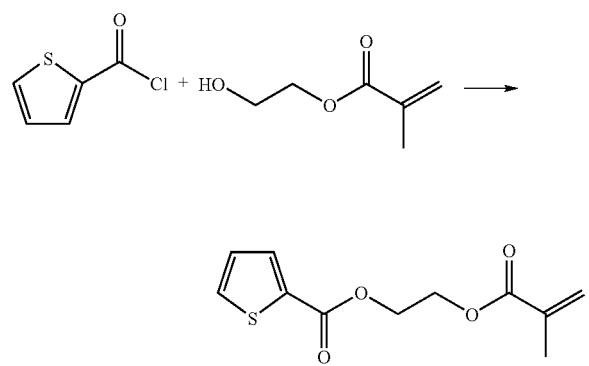

-continued

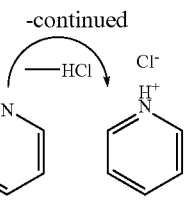

10 mL of anhydrous $CH_2Cl_2$ plus 5 mL 2-thiophenecarbonyl chloride (2-TCC) (46.8 mmol, 4.7 M solution) was added drop-wise to 100 mL of anhydrous $CH_2Cl_2$ (distilled, dried over molecular sieves, and de-gassed before use) plus 5.15 mL 2-hydroxyethyl methacrylate (HEMA, 5.53 g, 42.5 mmol, 0.425 M soln.) plus 4.05 mL pyridine (50 mmol) at 0° C. (under constant stirring). The solution was allowed to warm to room temperature by allowing the ice bath to melt and warm under ambient conditions. The formation of pyridinium chloride precipitate confirmed the reaction. The solution sat 40 hours and was filtered (to remove the pyridinium chloride), washed 3 times with dilute HCl (to remove pyridine) and washed once with dilute $NaHCO_3$ to remove 2-TCC. The solvent was removed in vacuum and the organic phase was dried with molecular sieves.

The product was characterized by FTIR and NMR. FTIR confirmed that the majority of the primary alcohol groups of HEMA were consumed. The methacrylate C=C was still present as evidenced by the peak at 1636 cm$^{-1}$. The peak at 1716 cm$^{-1}$ is the C=O for both the methacrylate ester and the thionyl ester. The peak at 1523 cm$^{-1}$ was assigned to the thiophene ring. NMR also confirmed that the desired product was formed. The starting material HEMA has an NMR spectrum with peaks at 1.95 ppm ($CH_3$), 3 ppm (OH), 3.85 and 4.28 ppm ($CH_2$), and 5.6 and 6.15 ppm (=$CH_2$). Protons from the methacrylate group were found in the synthesis product along with the aliphatic protons of the HEMA tail. However, the original hydroxyl proton was not present (at a chemical shift of 3 ppm), indicating the reaction of the alcohol to the acid chloride proceeded as desired. Additionally, the spectrum for the synthesis product contained the thiophene protons in the 3,4,5 positions.

Step B: Synthesis of BAB block copolymer

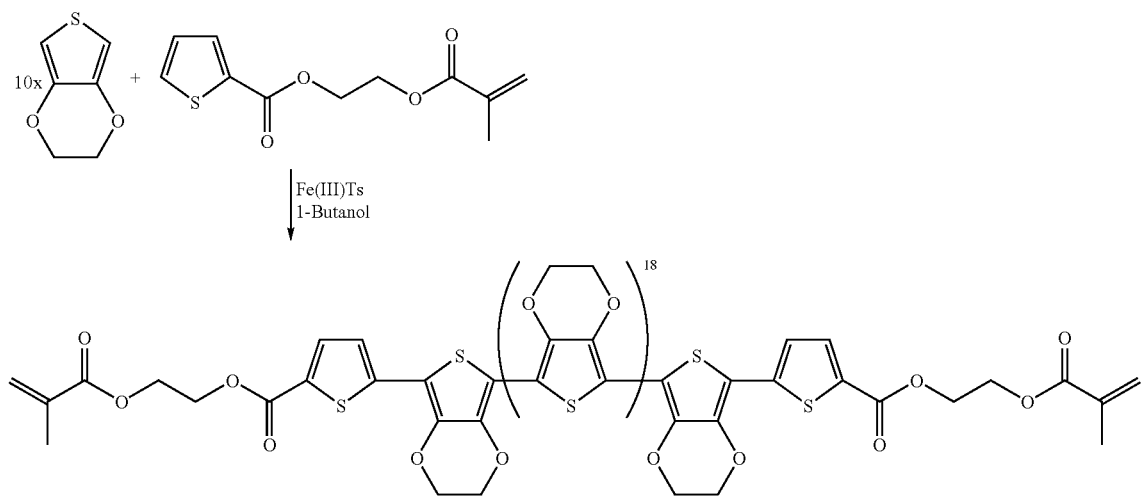

Theoretical doping level of 1:3, Ts:thiophene

In a round bottom flask the reactants were combined: 100 mL butanol, 0.25 g (1.04 mmol) HEMA-2-TCC synthesis product (as described in Step A), 29.5 g (20:1 wt ratio based on EDOT) Baytron C® (which is a 50 wt % solution of iron(III) tosylate in butanol), and 1.48 g (10.4 mmol) EDOT (dist.) added drop-wise. This mixture was stirred at room temperature.

After 12 total days of stirring at room temperature, the product was purified. The mixture was washed twice with a large excess volume of water (to remove the iron salt). The organic phase was blue and the water phase yellow. The organic phase was de-watered in vacuuo followed by drying with molecular sieves. The cast films were blue/opaque, conductive and re-dissolvable in butanol.

The FTIR spectrum of the product shows a sloped baseline that is typical of conducting polymers. The peak at 1715 cm$^{-1}$ confirms the presence of C=O from the methacrylate and thiophene-HEMA connection, the peak at 1522 cm$^{-1}$ confirms the thiophene rings, and the peaks at 1652 and 814 cm-1 confirm that the methacrylate C=C double bond survived during the oxidative polymerization of the EDOT monomer.

Example 5

Synthesis of Poly(Py-block-EG) (ABAB multi-block or Larger)

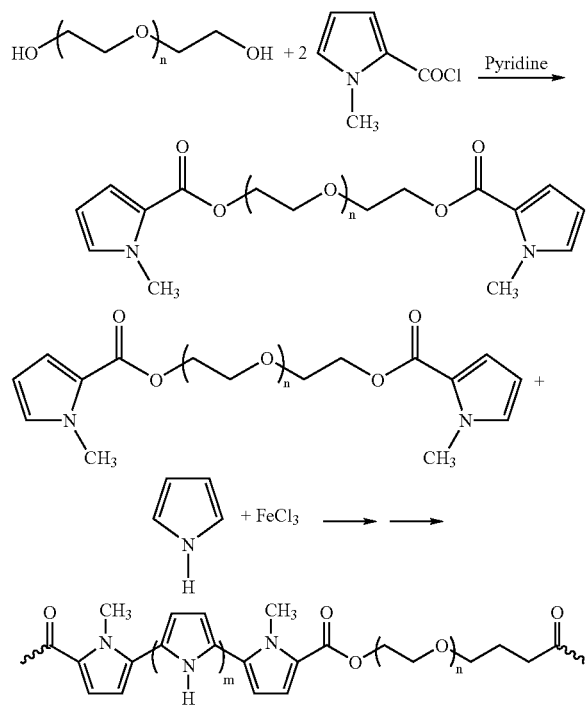

Block copolymers of pyrrole with ethylene glycol (poly (Py-block-EG)) were synthesized from pyrrole and a low molecular weight poly(ethylene glycol) (PEG) following the two-step synthesis below. PEG (for example MW=600) was reacted with N-methyl-2-pyrrole carbonyl chloride in the presence of pyridine to form the di-pyrrole derivative macromonomer PEGdPy. This macromonomer was then copolymerized with pyrrole in the presence of iron chloride and para-toluenesulfonic acid. For example, a solution of the PEGdPy ($2\times10^{-1}$ M) in water was mixed with a solution of iron (III) chloride ($2\times10^{-1}$ M) and para-toluenesulfonic acid ($2\times10^{-1}$ M) in water. To this mixture a diluted solution of pyrrole in methoxyethanol ($10^{-2}$ M) was added with a dropping funnel over a three-hour period at −20° C. and under strong stirring. The product was filtered to eliminate the homopolymer that eventually formed and then was extracted to eliminate unreacted reagents and the iron(II) chloride byproduct. In an alternative copolymerization method molecular oxygen was bubbled through an iced solution containing PEGdPy ($10^{-2}$ M), pyrrole ($10^{-1}$ M), alkylnaphthalenesulfonate ($2\times10^{-1}$ M), and a catalytic amount of Fe(II).

For simplicity, the synthetic scheme above represents the PPy segments in the neutral, non-conducting form. PPy segments are, however, in the oxidized, conducting form, and the counterions paratoluenesulfate or alkylnaphthalenesulfonate are present inside the conducting domains to balance the charges.

Example 6

Synthesis of Poly(EDOT-block-PG) (ABAB multi-block or Larger)

Block copolymers of EDOT with poly(propylene glycol), Poly(EDOT-block-PG), were synthesized from EDOT and a low molecular weight poly(propylene glycol) (PPG) oligomer following a two-step method in Example 1. PPG (MW=1500) was reacted with 2-thiophene carbonyl chloride in the presence of pyridine to form a di-thiophene derivative macromonomer PPGdTh. This macromonomer was then copolymerized with ethylenedioxythiophene (EDOT) in the presence of an oxidizing agent and a suitable counterion. This second step was preferably conducted in diffusion-controlled conditions to avoid the homopolymerization of thiophene; for example, a solution of the PPGdTh ($2\times10^{-1}$ M) in 1-pentanol was mixed with a solution of sodium persulfate ($2\times10^{-1}$ M) and poly(para-styrenesulfonate) in water. To this mixture a diluted solution of EDOT in 1-pentanol ($10^{-2}$ M) was added dropwise under strong stirring at 80° C. The product was filtered to eliminate the homopolymer and then extracted with water to eliminate unreacted monomer and byproducts.

Example 7

Synthesis of Poly(Th-block-PG) (ABAB multi-block or Larger)

Block copolymers of thiophene (Th) with propylene glycol (poly(Th-block-PG)) were synthesized from thiophene and a low molecular weight poly(propylene glycol) (PPG) following a two-step method of Example #1. PPG (MW=600) was reacted with 2-thiophene carbonyl chloride in the presence of pyridine to form a di-thiophene derivative macromonomer PPGdTh. This macromonomer was then copolymerized with thiophene in the presence of an oxidizing agent and an opportune counterion. For example, a solution of the PPGdTh ($2\times10^{-1}$ M) in acetonitrile was mixed with a solution of thiophene in acetonitrile ($10^{-2}$ M). To this mixture a solution of iron (III) chloride ($2\times10^{-1}$ M) and para-toluenesulfonate ($2\times10^{-1}$ M) in water was added with a dropping funnel over a three-hour period at 40° C. The product was filtered to eliminate the homopolymer that eventually formed and extracted to eliminate unreacted reagents and the byproduct iron (II) chloride.

Example 8

Synthesis of Poly(EDOT-block-NBR) (ABAB multi-block or Larger)

Block copolymers containing segments of PEDOT and segments of nitrile-butadiene rubber (poly(EDOT-block-NBR)) were synthesized from EDOT and a low molecular weight amino-terminated nitrile-butadiene rubber.

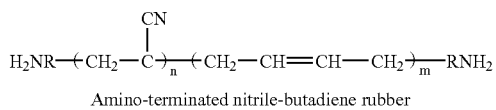

Amino-terminated nitrile-butadiene rubber

The amino-terminated nitrile-butadiene rubber (Hycar ATBN from Noveon) was first reacted with thiophene sulfonylchloride shown below to form a dithiophene-terminated macromonomer (NBRdTh). This macromonomer was then copolymerized with EDOT under diffusion-controlled conditions. For example a solution of NBRdTh ($2\times10^{-1}$ M) in methylethyl ketone (MEK) was mixed with a solution of sodium persulfate ($2\times10^{-1}$ M) and poly(para-styrenesulfonate) in water. To this mixture a solution of EDOT in MEK ($10^{-1}$ M) was added drop wise under stirring at 80° C. The product was filtered to eliminate the homopolymer and extracted with water to eliminate the unreacted reagents and byproducts.

Synthesis of di-thiophene terminated macromonomer from thienyl-sulfonyl chloride.

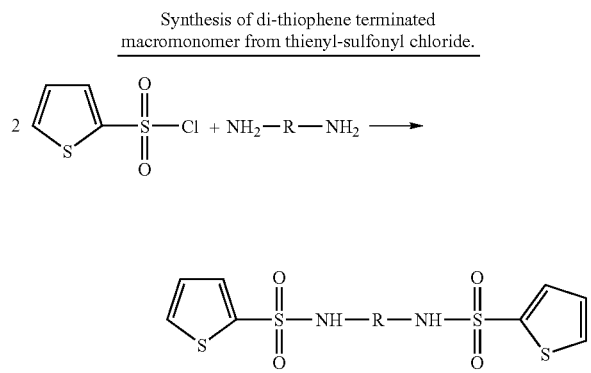

Example 9

Alternative synthesis of Poly(EDOT-block-EG) (ABAB Multi-block or Larger)

Poly(EDOT-block-EG) was synthesized from a di-EDOT terminated macromonomer (PEGdEDOT) prepared by reacting a di-chloro terminated PEG oligomer with an EDOT that has been lithiated in position 2, as illustrated below. The di-EDOT terminated macromonomer was then copolymerized with EDOT. For example, a solution containing 1 mmol of PEGdEDOT, and 10 mmol of EDOT in butanol was heated at 80° C. To this solution, a solution of $Na_2S_2O_8$ in water was added drop wise over the course of several hours. After completion of the reaction the product was filtered and extracted.

Synthesis of di-EDOT terminated macromonomer.

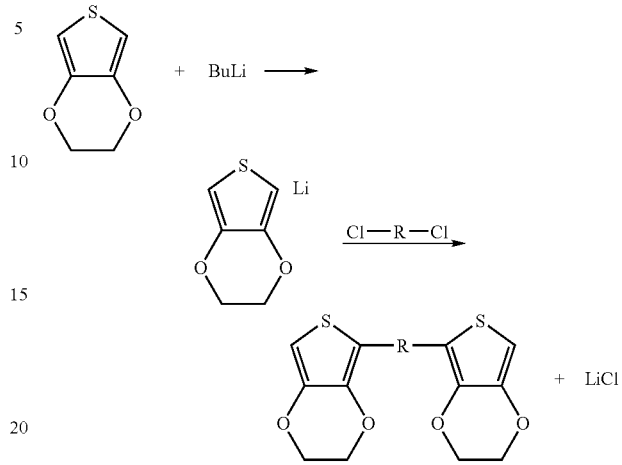

Example 10

Polyethylene Glycol monomethacrylate/thiophene-co-EDOT (BAB tri-block Copolymer)

Mono-thiophene terminated poly(ethylene glycol) monomethacrylate was prepared from poly(ethylene glycol) mono-methacrylate of molecular weight of 200, 400, or 1000 Daltons with the strategy outlined in Example 4. 2-Thiophenecarbonyl chloride (1 eq) was added to poly(ethylene glycol) monomethacrylate (1 eq) and pyridine (1.2 eq) in dry $CHCl_3$ and refluxed overnight. The solvent was removed in vacuuo and the residue was redisolved in hot $CH_2Cl_2$. After cooling, the pyridine hydrochloride precipitated and was removed by filtration. The filtrate was washed 3 times with dilute HCl to remove excess pyridine, and with $NaHCO_3$ to remove pyridine hydrochloride and any potential 2-thiophene carbonyl chloride and/or its hydrolysis product, 2-thiophene carboxylic acid.

BAB block copolymers were formed by the strategy outlined in Example #4. In a round bottom flask 100 mL butanol, 1.0 mmol mono-thiophene terminated poly(ethylene glycol) monomethacrylate, and 29.5 g Baytron C® by Bayer (a 50 wt % solution of iron(III) tosylate in butanol) were mixed. Then 1.48 g (10.4 mmol) EDOT (dist.) was added drop-wise. This mixture was stirred 2 hours at 80° C. and one week at room temperature. The mixture was then washed twice with a large excess volume of water and the organic phase was dried with molecular sieves.

Example 11

Synthesis of HEMA/thiophene-co-3-hexylthiophene (BAB tri-block Copolymer (Exp 1)

Step A: Synthesis of End-Capped Precursors

A methacrylated end-capped monomer was synthesized from hydroxyethyl methacrylate (HEMA) and 2-thiophenecarbonyl chloride. This molecule was later used as the "B" end-cap of BAB tri-block copolymers of 3-hexylthiophene conducting oligomers.

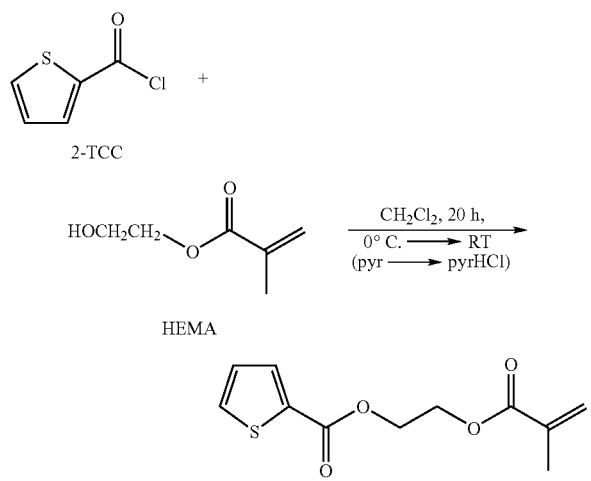

10 mL of anhydrous $CH_2Cl_2$ plus 5 mL 2-thiophenecarbonyl chloride (2-TCC) (46.8 mmol, 4.7 M solution) was added drop-wise to 100 mL of anhydrous $CH_2Cl_2$ plus 5.15 mL HEMA (5.53 g, 42.5 mmol, 0.425 M soln.) plus 4.05 mL pyridine (50 mmol) at 0° C. (under constant stirring). The solution was allowed to warm to room temperature by allowing the ice bath to melt and warm under ambient conditions. The formation of pyridinium chloride precipitate confirmed the reaction. The solution sat overnight and was filtered the following day (to remove the pyridinium chloride), washed 3 times with dilute HCl (to remove pyridine) and washed 1 time with dilute $NaHCO_3$ to remove 2-TCC. The organic phase was dried with excess $MgSO_4$ (anhydrous) to remove $H_2O$. The $CH_2Cl_2$ was removed under vacuum and the product was characterized by Fourier transform infrared (FTIR) and nuclear magnetic resonance (NMR) spectroscopy. FTIR spectroscopy confirmed that the majority of the primary alcohol groups of HEMA were consumed. The methacrylate C=C was still present as evidenced by the peak at 1636 $cm^{-1}$. The peak at 1716 $cm^{-1}$ was the C=O for both the methacrylate ester and the thionyl ester. The peak at 1523 $cm^{-1}$ was associated with the thiophene ring.

NMR spectroscopy also confirmed that the desired product was formed. The starting material HEMA has an NMR spectrum with peaks at 1.95 ppm ($CH_3$), 3 ppm (OH), 3.85 and 4.28 ppm ($CH_2$), and 5.6 and 6.15 ppm (=$CH_2$). Protons from the methacrylate group were found in the synthesis product as well as the aliphatic protons of the HEMA tail, however, the original hydroxyl proton was not present (at a chemical shift of 3 ppm) indicating the reaction of the alcohol to the acid chloride proceeded as desired. Additionally, the spectrum for the synthesis product contained the thiophene protons in the 3,4,5 positions. This product was found to be stable at 80° C. for 14 hours under dark conditions.

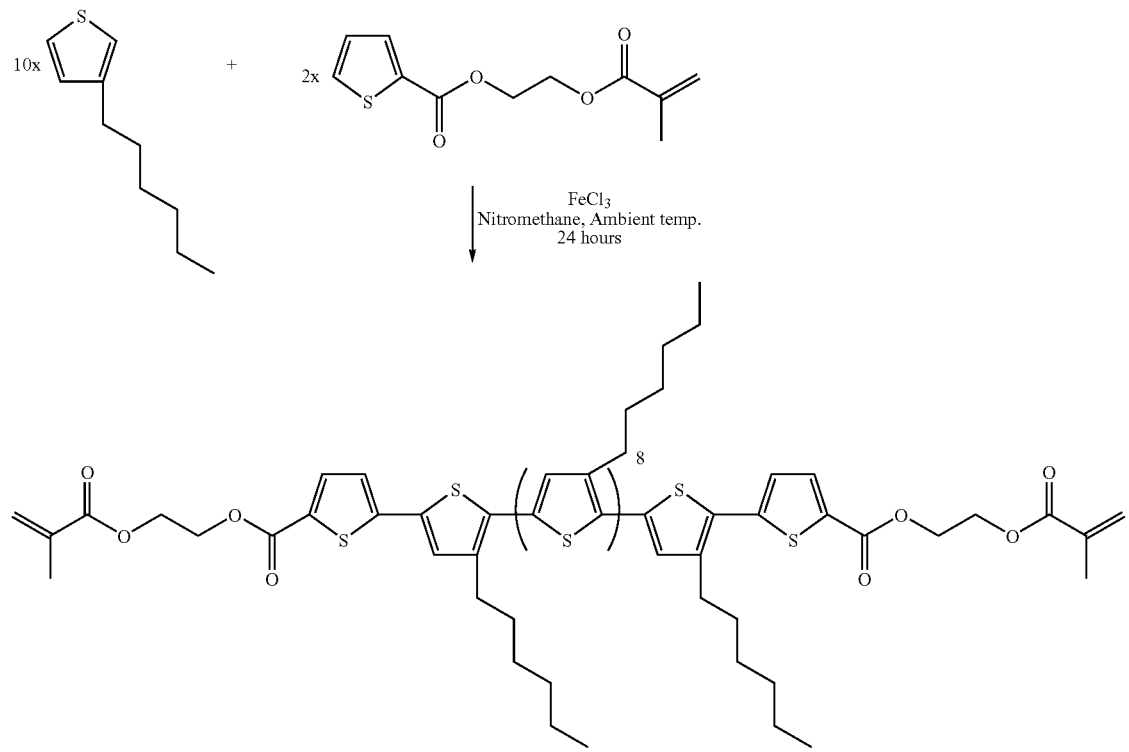

Step B: Synthesis of the BAB tri-block copolymer 4.37 g of $FeCl_3$ was dissolved in 75 ml $CH_3NO_2$ and poured into a round bottom flask. 0.48 g 2-TCC/HEMA (precursor from Step A) and 1.51 g 3-hexylthiophene were combined in 10 ml $CH_3NO_2$ and added to $FeCl_3$ solution dropwise. The color immediately changed from red to dark green. Initially there was no precipitate. The mixture was stirred at room temperature in air for 24 hours. The dark green solution was then filtered to recover a blue/black solid. The solid was washed twice with 10 ml $CH_3NO_2$ to remove $FeCl_3$ and $FeCl_2$ (spent oxidizing agent), leaving 1.66 g of a blue solid. A small amount of a non-soluble material was filtered with glass wool. The product was soluble in $CHCl_3$ and THF. The product yield was 68-72%, of a blue soluble solid that had a conductivity of $1.4 \times 10^{-2}$ S/cm Step C: Photo-Crosslinking of the Tri-Block Copolymer The product from Example 11 Step B was dissolved in $CHCl_3$ and 0.5 wt. % of 2,2-dimethoxy-2-phenyl acetophenone (DMPA, an initiator of radical polymerization) was added to the solution. The solution was cast on a glass substrate and the resulting thin film was irradiated with ultraviolet light at an intensity of 10 mW/cm². The thin film was photocrosslinked to form an insoluble and conducting material.

Example 12

Synthesis of PEG400 methacrylate/thiophene-co-3-hexylthiophene (BAB tri-block Copolymer)

Step A: Synthesis of End-Capped Precursors

A methacrylate end-capped monomer was synthesized from poly(ethylene glycol) mono-methacrylate (MW=400) and 2-thiophenecarbonyl chloride. This molecule was later used as the "B" end-cap of BAB tri-block copolymers of 3-hexylthiophene conducting oligomers.

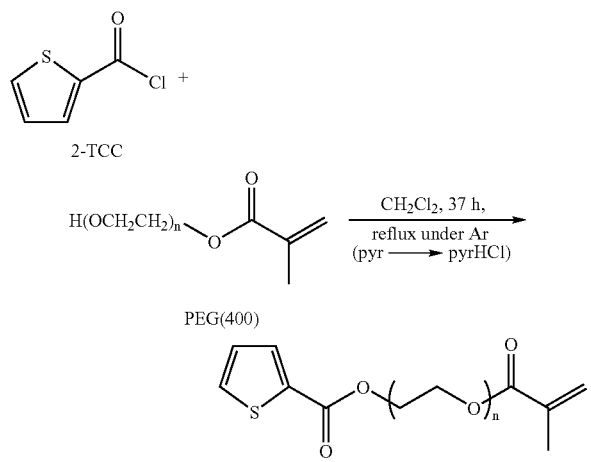

We followed the same procedure outlined in Example 11 Step A, except that the temperature was elevated to 45° C.

This reaction produced a visible precipitate of the pyridine salt. A small amount of ethyl ether was added to further precipitate the pyridine salt. After filtration of the solid, the solvent was evaporated leaving a yellow liquid. The NMR spectrum of this oil confirmed the formation of the desired product.

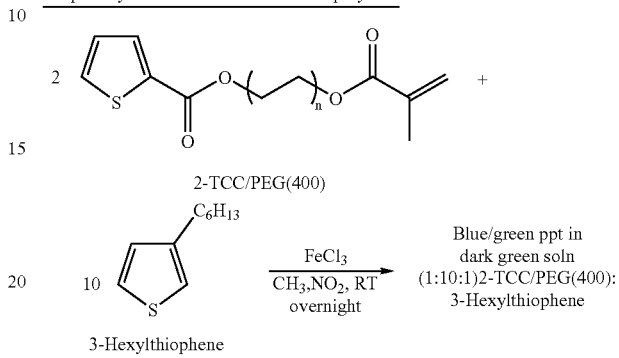

3.11 g of $FeCl_3$ was dissolved in 75 ml $CH_3NO_2$ and poured into a round bottom flask. The reagents, 0.716 PEG(400) methacrylate/thiophene (precursor from Step A) and 1.09 g 3-hexylthiophene were combined in 10 ml $CH_3NO_2$ and added to the flask dropwise. The mixture was stirred at room temperature in air overnight. The contents of the flask were filtered and the blue/black solid collected on the frit was washed twice with 15 ml $CH_3NO_2$ to remove $FeCl_3$ and $FeCl_2$. The blue solid remaining on the frit was extracted with a total of 200 ml $CHCl_3$, and the $CHCl_3$ extract was dried in vacuuo, yielding a total of 0.959 g blue, hard and elastomeric solid. The yield was 49-51% and the product was soluble in $CHCl_3$. Films made of the product had a conductivity of $3.3 \times 10^{-3}$ S/cm. The film containing a photo-initiator were photo-crosslinked to form non-soluble conducting films by a similar method to Example 11 Step C.

Example 13

Synthesis of PEG400 methacrylate/thiophene-co-EDOT (BAB tri-block Copolymer)

Step A: Synthesis of End-Capped Precursor

A methacrylate end-capped precursor was synthesized from poly(ethylene glycol) mono-methacrylate (MW=400) and 2-thiophenecarbonyl chloride as described in Example 12, Step A.

Step B: Synthesis of BAB tri-block copolymer

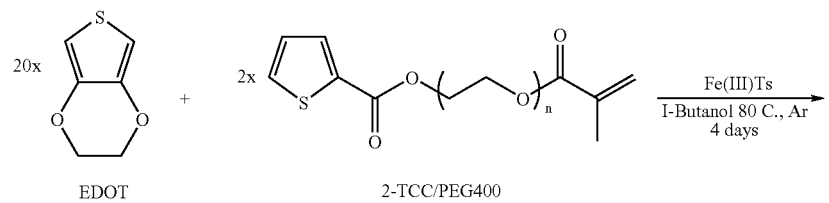

-continued

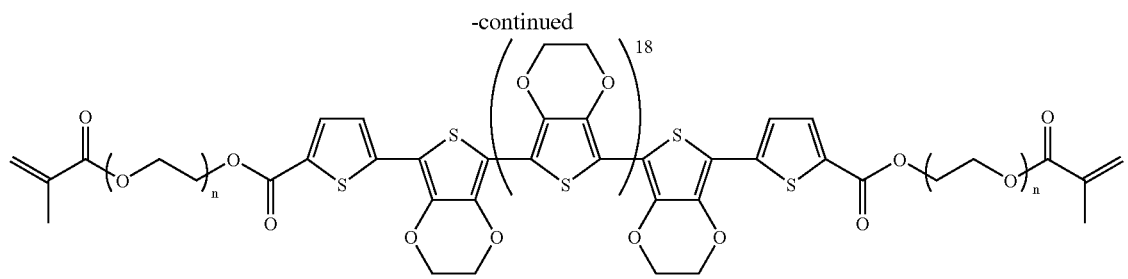

In a round bottomed flask 0.452 g 2-TCC/PEG 400 mono-methacrylate (1.14 mmol, precursor from Example 12 part A), 34.738 g of Baytron® C, and 100 mL n-butanol were heated to 80° C. with stirring. 1.628 g EDOT (11.8 mmol) were added dropwise over 4 hours, The reaction mixture was cooled to room temperature and stirred for 4 days. The dark blue/green solution was filtered and extracted with water. The solution was cast onto a polycarbonate sheet to form a conducting film that can be partially re-dissolved in butanol.

Example 14

Synthesis of PEG400 methacrylate/thiophene-co-thiophene (BAB tri-block Copolymer)

Step A: Synthesis of End-Capped Precursors

A methacrylate end-capped precursor was synthesized from poly(ethylene glycol) mono-methacrylate (MW=400) and 2-thiophenecarbonyl chloride as described in Example #12 Step A.

ing. The dry film could be re-dissolved completely in nitromethane and partially in butanol.

Example 15

Synthesis of di-ol BAB tri-block Copolymers and Conducting Polyurethane Coatings A di-ol triblock copolymer, of the structure HO-BAB-OH, was synthesized from 3,4-ethylenedioxythiophene and a precursor that contained a hydroxyl group at one end and an EDOT group at the other end. This precursor was prepared by reacting a mono-amino mono-hydroxyl terminated poly(ethylene glycol) oligomer with 3,4-ethylenedioxythiophene-2-carboxaldehyde under the conditions described in Example #18, Part A. 3,4-Ethylenedioxythiophene-2-carboxaldehyde was prepared according to the Mohanakrishnan method in high yield (Mohanakrishnan et al., *Tetrahedron*, 55, 11745-11754 (1999)). The tri-block copolymers were made as follows: 2 mmol of PEGmonoEDOT with average molecular weight of 1500 Dalton and 170 mmol EDOT were mixed in butanol and heated at 80° C. To this solution, a solution of Baytron® C from Bayer (50% iron p-toluenesulfonate in butanol) was added dropwise over 30 minutes. The reaction was stirred at room Step B: Synthesis of tri-block copolymer

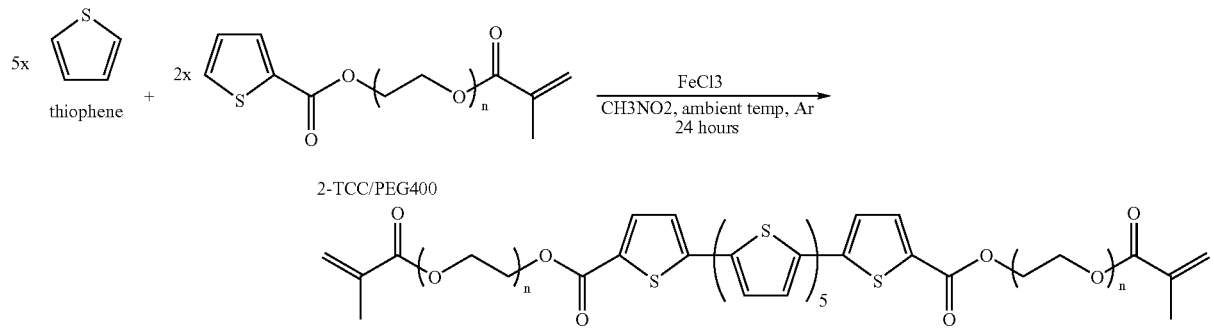

Thiophene (0.524 g, 6.2 mmol), PEG400 mono-methacrylate/mono-thiophene (1.31 g, 2.6 mmol), FeCl$_3$ (2.74 g, 16.9 mmol), and CH$_3$NO$_2$ (100 mL) were mixed in a flask and stirred for 24 hours at ambient temperature under argon. The product solution was poured into 150 mL of 50:50 (v:v) mixture of Et$_2$O:HCl, conc. A solid precipitated and the liquid layers separated. The upper organic phase was separated and washed first with conc. HCl and then with water (5 times). Thin films made from this solution were conducttemperature for 6 days then the product was filtered and extracted with copious amount of water. Butyl acetate (150 mL) was added under stirring and the butanol was removed by fractional distillation. The resulting butyl acetate suspension was mixed with a trimer of hexamethylene diisocyanate at a ratio NCO/OH of 1.2 (Bayhydrur XP 7007 from Bayer). This mixture was used to cast coatings on primed iron panels. The resulting polyurethane coatings had a conductivity of $1 \times 10^{-4}$ S/cm.

Example 16

Synthesis of poly(EDOT-block-EG 1500) with PEG 1000 Endcaps (endcapB'-ABABA-B'endcap multi-block Copolymer)

Step A: Synthesis of end-groups

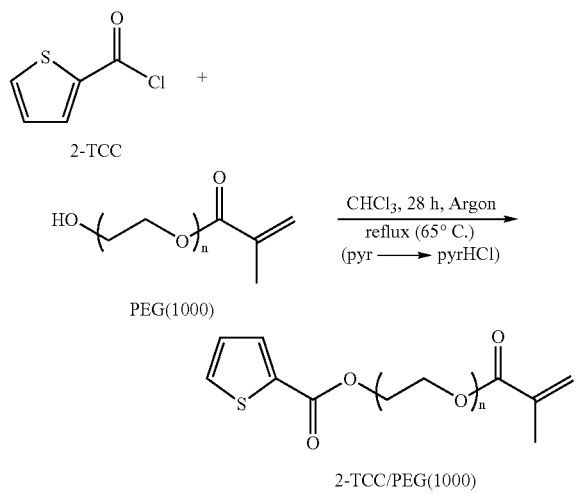

PEG(1000)

2-TCC/PEG(1000)

This reaction was conducted under argon using standard Schlenk techniques. 0.98 g of pyridine and 11.40 g PEG mono-methacrylate (MW=1000) were premixed in 130 ml CHCl₃. 1.2 ml 2-TCC was added dropwise with a syringe. The mixture was refluxed for 28 h, then cooled to room temperature. No precipitate, (i.e., pyridine hydrochloride) was noted even after several hours. The solution was extracted with 5% HCl (aq.) then 5% HaHCO₃. CHCl₃ from the organic portion was removed by vacuum distillation leaving approximately 8 g of a yellow liquid. The NMR spectrum was consistent with the desired product.

Step B: Synthesis of PEG (1500) di-thiophene Segments
PEGdTh (1500) was synthesized by the method in Example 2, Step A.

Step C: Synthesis of end-capped multi-block copolymer

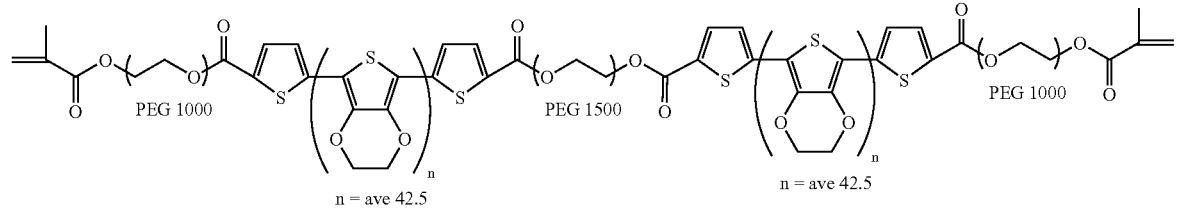

In a 100 mL round-bottom flask, a mixture of PEGdTh (1500) (0.116 g, 0.067 mmol), PEG1000 monomethacrylate thiophene (153 g, 0.134 mmol) and Baytron® C (16.59 g) were heated to 80° C. with stirring. To the heated mixture, a solution of 0.805 g (5.7 mmol) of EDOT (Baytron® M from Bayer) in 5 mL of n-butanol was added dropwise over 35 minutes. After the addition, the heater was switched off and the reaction mixture was left stirring at room temperature for 7 days. A thick green-bluish solution was obtained. A fraction of this solution was tested for conductivity giving positive results. The solution was then filtered but no residue was collected. The sample was then extracted with an excess (10 times the organic phase) of water. Because water did not separate from the butanol phase, NaCl was added. The extracted deep-blue organic phase was used to coat a polycarbonate sheet with a hand coater. The resulting coating was conductive. No precipitate was present after storing the deep-blue solution for two months.

Example 17

Synthesis of poly(EDOT-block-EG1098)

STEP A: Synthesis of PEG(1098)dEDOT

A di-EDOT terminated poly(ethylene glycol) segment was synthesized by alkylation of a Poly(ethylene glycol) diglycidyl ether with lithiated EDOT (Keegstra, M. A.; T. A. Peters; L. Brandsma; (1992) "Copper (I) Catalysed Synthesis of Alkyl Aryl and Alkyl Heteroaryl Ethers," *Tetrahedron*, 48, 3633-3652).

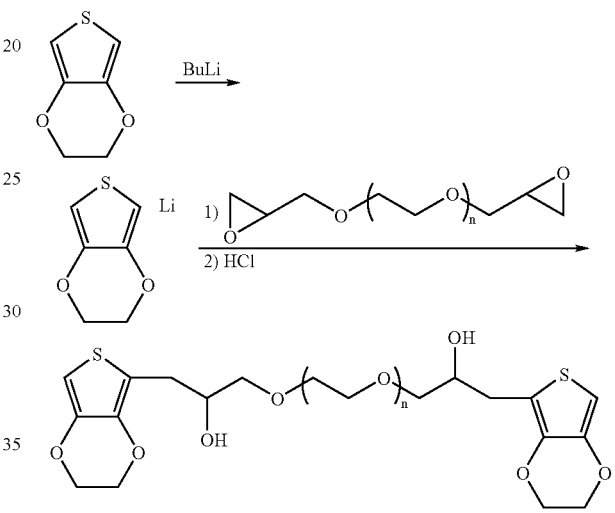

A solution of EDOT (5.408 g=38.0 mmol, Bayer) in dry THF (20 ml) under argon was cooled to −80° C. with an acetone/liquid nitrogen slurry. A 1.4 M solution of methyl lithium in diethyl ether (26.5 ml=37.1 mmol, Aldrich) was added with stirring over the course of about one minute. Poly(ethylene glycol) diglycidyl ether with average molecular weight of 1098 Daltons (10.5 g=9.56 mmol, Denacol EX 861 by Nagase America Corporation) diluted in 25 ml of dry THF was transferred to the reaction flask. Upon addition, a thick cream-colored solid formed (the lithium alkoxide salt of the product). After addition, the flask was removed from the cold acetone bath and allowed to warm to room temperature. Two hours after the addition, approximately 50 ml of 5% HCl was added to the reaction flask, making the aqueous phase to pH ~1. After 16 hours, the product was extracted with CH₂Cl₂, washed with water (2×50 ml) and evaporated at reduced pressure and ~35° C. for 6 hours.

¹H-NMR analysis showed that the crude contained the desired product and unreacted EDOT in a molar ration of 1:2.6. Therefore the yield of the di-substituted product over the poly(ethylene glycol) diglycidyl ether is 64% and the yield over the EDOT (including the recovered unreacted materials) is 74%.

Step B: Synthesis of poly(EDOT-block-EG1098)

Para-toluenesulfonic acid (14.17 g, 73.3 mmol=1.35 eq), dodecylbenzenesulfonic acid (22.80 g, 48.9 mmol=1.35 eq), ammonium persulfate (8.36 g, 36.2 mmol=1 eq), and iron (III) sulfate (0.058 g, 0.11 mmol=0.003 eq) were mixed in 100 mL of DI water. EDOT (5.18eg, 36.2 mmol=1 eq) was mixed with PEG(1098)dEDOT (1.27 g, 0.904 mmol=1/40 eq) in 200 mL of 1-butanol and added dropwise to the aqueous solution over 4 hours. The resulting solution was stirred at room temperature for 24 hours. The organic layer was washed with water 3 times, then 2 times with concentrated sodium chloride solution, and 2 more times with DI water. A portion of the deep blue organic phase was dried in a vented oven a pressed to form a pellet with conductivity of $2.3 \times 10^{-3}$ S/cm.

Alternative Step B: Synthesis of poly(EDOT-block-EG 1098)

In a 100 mL round-bottomed flask dEDOT PEG$_{1098}$ (0.228 g, $1.655 \times 10^{-4}$ mole) was mixed with Baytron® C from Bayer (45 g) and heated to 80° C. A solution of EDOT (2 g, 0.014 mole) in 4 mL 1-butanol was added dropwise. At the end of the addition, the reaction mixture was removed from the oil bath and stirred at room temperature for 7 days. The blue fine dispersion was diluted with 15 mL of fresh 1-butanol and washed with 200 mL DI-water (x3). The organic phase was stored in a first vial. The combined aqueous fractions were extracted with 20 mL of fresh 1-butanol and this was stored in a second vial. Both samples were dried in a vented oven and tested for conductivity with a Jandel four point conductivity probe. The sample from the first vial had a conductivity of $3.4 \times 10^{-2}$ S/cm, the sample from the second vial had a conductivity of 0.14 S/cm.

Example 18

Synthesis of Poly(pyrrole-block-ethylene Glycol)

Step A: Synthesis of Pyrrole end-capped poly(ethylene glycol) Jeffamine XTJ-500

In a 1000 mL three-necked round-bottomed flask equipped with a Dean Stark trap and a condenser, a diamino-terminated poly(ethylene glycol) having average molecular weight of 600 Daltons (Jeffamine XTJ-500 from Huntsman, 50 g, 0.083 mole) was dissolved in dry toluene (~250 mL) under argon atmosphere. The solution was heated to 70° C., pyrrole-2-carboxaldehyde (16.01 g, 0.167 mole) was added drop-wise, and the mixture refluxed at 80° C. 3 hours under Ar. The brown solution was taken to dryness by rotavap and the residue was dissolved in ~250 mL of dry ethanol. The stirred solution was treated with NaBH$_4$ (6.38 g, 0.167 mole) at room temperature for one hour and acidified to a pH value of 2 with concentrated HCl. The precipitate was collected by filtration and discarded. Removal of the solvent gave a thick, brown, oily residue that was dissolved in ~200 mL DI-water. The aqueous solution was washed with ~250 mL CH$_2$Cl$_2$ (2 times), and the pH was raised to 11 with a saturated solution of NaOH. An oil-like residue was extracted with fresh CH$_2$Cl$_2$ and the organic fraction was dried over MgSO$_4$ for 20 minutes. Removal of the solvent gave the desired product (pyrrole end-capped XTJ-500 (dPyXTJ-500)) as dark brown, thick oil in 50% yield. ¹H-NMR (CDCl$_3$): δ (ppm) 6.697 (m, pyrrole), 6.071 (m, pyrrole), 5.988 (m, pyrrole), 3.804 (m, —CH$_2$—NH—), 3.602 (m, —CH$_2$—O—), 1.038 (m, —CH(CH$_3$)—O—).

Step B: Copolymerization of Pyrrole and Pyrrole end-capped XTJ-500

The synthesis of a block copolymer with a molar ratio of 40:1 pyrrole to pyrrole end-capped XTJ-500 (dPyXTJ-500) was carried out with ammonium persulfate as the oxidizing agent and dodecylbenzenesulfonic acid (DBSA) as counterion.

Pyrrole (35.4 g, 0.527 mole) was added to dPyXTJ-500 (10 g, 0.0132 mole) that has been diluted with 111.14 g DI-water and a two-phase system formed. Dodecylbenzenesulfonic acid (125.93 g, 0.27 mole) was then added to the mixture under stirring and the mixture formed a homogeneous brown solution. The solution was diluted with 71.94 g of water, cooled to 0° C. and an aqueous solution of ammonium persulfate (25.17 g in 100 g H$_2$O) was added

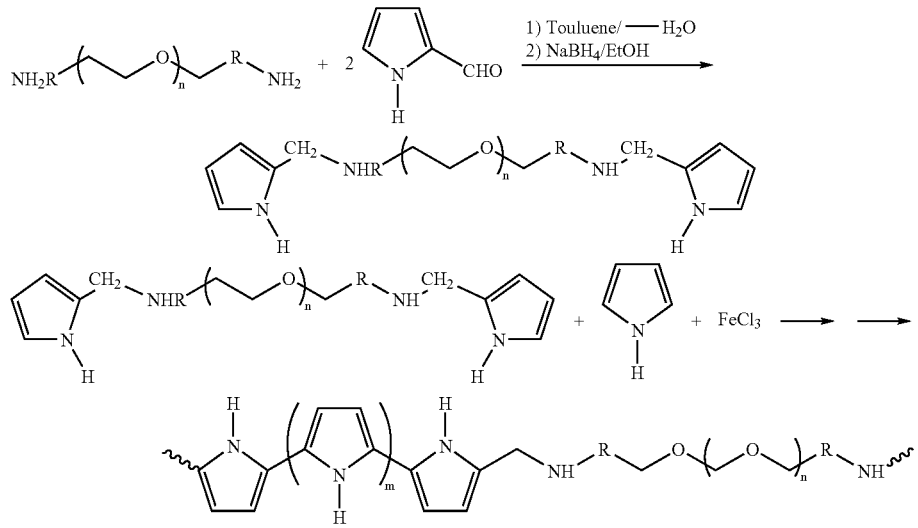

dropwise over 15-20 minutes. The reaction mixture was stirred at 0° C. for 48 hours and a suspension of blue/black polymer particles of medium size in a cloudy white solution was obtained.

A portion of this mixture (260 g) was diluted with 256.37 g of $CHCl_3$ and shaken to form an emulsion with no phase separation. The mixture was centrifuged at 9000 rpm for 3 to 5 minutes. After centrifugation, three bands formed: Top clear layer, an emulsion and the organic layer containing the majority of the product. The bottom organic band was separated and collected as a homogeneous thick black solution with a copolymer concentration of 21 wt. %. An aliquot was dried for conductivity. Conductivity of a pressed pellet was $4\times10^{-3}$ S/cm as determined by the four point method. The dry polymer re-dispersed in chloroform and N-methylpyrrolidone very rapidly. Residues from chloroform and N-methylpyrrolidone solutions respectively, were conductive.

Example 19

Synthesis of Block Copolymer of Polypyrrole Containing Ester Linkages

The synthesis of block copolymers of polypyrrole containing hydrolyzable (biodegradable) ester linkages was carried out in three steps: first 2-pyrrolecarboxyaldehyde was reacted with an excess of hexamethylene diamine, then the pyrrole mono-end capped hexamethylene diamine was reacted by Michael addition with a diacrylate-terminate poly(ethylene glycol) segment. The product of this reaction was then copolymerized with pyrrole in the presence of ammonium persulfate and dodecylbenzenesulfonic acid. The product of this synthesis has uses in biomedical applications Step A: Synthesis of Pyrrole mono-end Capped Hexamethylenediamine A 500 mL two-necked round-bottomed flask equipped with a Dean Stark trap and a condenser was placed in an oil bath and purged with argon. Hexamethylenediamine (100 g, 0.843 mole) was added to 50 mL of dry toluene and the sample was heated to 100° C., then a solution of pyrrole-2-carboxaldehyde (3.21 g, 0.034 mole) in dry toluene (30 mL) was added dropwise. The reaction mixture was refluxed 3 hours at 140° C. The sample was partially cooled and the solvent and the excess hexamethylenediamine were removed under vacuum. The oily brown residue was dissolved in dry ethanol (100 mL) and then treated with $NaBH_4$ (1.4 g, 0.037 mole) for one hour at room temperature. The mixture was acidified to pH 2 with concentrated HCl. The precipitate was removed and the filtrate was taken to dryness to give a thin brown oily residue. The solid precipitate was re-dissolved in 100 mL DI-water and washed with an excess of $CH_2Cl_2$. The aqueous phase was brought to pH 11 with NaOH and extracted with fresh $CH_2Cl_2$. The organic fraction was dried over $MgSO_4$, filtered and taken to dryness to give the product as a redish brown oily residue with a yield of 65%. $^1$H-NMR ($CDCl_3$): δ(ppm) 9.38 (s, $-NH_2$); 6.64, 6.06, 5.97 (m, 3H, Pyrrole Hs); 3.707 (s, 2H, pyrrole-$CH_2-$); 2.589 (m, 2H, $-CH_2-NH_2$); 1.338 (m, $-CH_2-$).

Step B: Michael Addition Reaction between Pyrrole Mono-Capped Hexamethylenediamine and Diacrylated PEG(600)

A solution of pyrrole mono-capped hexamethylenediamine (1 g, $5.12\times10^{-3}$ mole) in 12 mL acetone was placed in a 100 mL two-necked round-bottomed flask purged with Ar. The solution was heated to 40° C. and slowly reacted with a solution of diacrylated polyethyleneglycol having average molecular weight of 742 Dalton (SR-610 from Sartomer, 1.9 g, $2.56\times10^{-3}$ mole) in 8 mL acetone. The reaction mixture was diluted with 4 mL fresh acetone, refluxed for 5 hours and further stirred at room temperature overnight. The solvent was removed to give the desired product in quantitative yield as a brown thin oil-like residue. $^1$H-NMR ($CDCl_3$): δ (ppm) 6.734, 6.086, 5.978 (Pyrrole Hs), 4.252 (m, 4H, $-COO-CH_2-$), 3.751 (m, 4H, $-CH_2$-pyrrole), 3.655 ($-CH_2-O-$), 2.771 (m, 4H, $-CH_2-NH$-pyrrole), 2.467 (m, 12H, $-CH_2-NH-R$), 1.414-1.267 (m, 16H, $-CH_2-$ hexamethylenediamine).

Step C: Synthesis of Block Copolymer of Pyrrole and Michael Addition Product

A solution of the Michael addition product from Step B (2.0 g, $1.76\times10^{-3}$ mole) in 30 mL of DI-water was placed in a 100 mL Erlenmeyer flask. Pyrrole (4.73 g, $7.05\times10^{-2}$ mole) and dodecylbenzenesulfonic acid (DBSA, 16.9 g, $7.21\times10^{-2}$ mole) were added to the solution under stirring. The sample was cooled to 0° C. and slowly reacted with a solution of ammonium persulfate (3.29 g, $1.44\times10^{-2}$ mole) in 30 mL water. The reaction mixture was stirred at 0° C. for 48 hours to obtain a thick, paste-like dark brown suspension. The raw material was extracted with $CHCl_3$ forming an excellent suspension that gels with time. A fraction of this suspension was taken to dryness at room temperature and the residue was pressed in a pellet for conductivity measurements. The conductivity measured with a four-point linear probe was $3.68\times10^{-2}$ S/cm.

Those of ordinary skill in the art will appreciate that starting materials, procedures, reactants, solvents, reaction conditions (temperature, solvent, reagent and reactant concentrations, etc.) other than those specifically exemplified can be employed in the practice of this invention without resort to undue experimentation. The skilled artisan will further be aware of materials, methods and procedures which are functional equivalents of the materials, methods and procedures specifically exemplified herein. All such art-known functional equivalents are intended to be encompassed by this invention.

All references cited herein are incorporated by reference herein to the extent that they are not inconsistent with the teachings herein.

We claim:

1. A block copolymer which comprises at least one block of a poly(heteroaromatic) polymer and at least two blocks of a second polymer wherein:

the poly(heteroaromatic) polymer block comprises repeating units of one or more heteroaromatic monomers which are bonded to each other by chemical bonds formed between carbon atoms of the heteroaromatic rings of the monomers and are selected from the group consisting of pyrroles, thiophenes, selenophenes, tellurophenes, furans, indoles, isoindoles, pyridines, pyrimidines, pyrazines, triazines, imidazoles, quinolines, isoquinolines, benzimidazoles, thiazoles, triazoles, oxadiazoles, dithienobenzene, carbazoles, benzothiophenes, isobenzothiophenes, benzofurans, isobenzofurans, isobenzoselenophenes, isobenzotellurophenes, their substituted derivatives, and mixtures thereof; and the at least two second polymer blocks are selected from the group consisting of polyethers, poly(fluoroethers), polyglycols, polyacetals, polyolefins, polystyrene, polyfluoroolefins, polyoxides, polychlorolefins, polychlorofluoroolefins, polysiloxanes, polyesters, polybromoesters, natural and synthetic rubbers, polyols, polyalcohols, polyacids, polycarbonates, polyanhydrides, polysulfides, polyamides, polyamines, polyimides, vinyl polymers, polymers derived from the polymerization of unsaturated monomers, polyacrylates, polymethacrylates, polyacrylonitriles, polybutadiene, alkyds, polyurethanes, epoxies, cellulose and its derivatives, starch and its derivatives, polypeptides, and copolymers thereof, wherein the at least two blocks of the second polymer are not linked to each other;

wherein the at least one poly(heteroaromatic) polymer block is either oxidized or reduced to polyionic form and is associated with counterions that balance the charge of the polyionic block and wherein the block copolymer is an electrically conductive polymer.

2. The electrically conductive block copolymer of claim 1 wherein the at least two blocks of a second polymer are blocks of different polymers.

3. The electrically conductive block copolymer of claim 1 wherein the heteroaromatic monomers of the poly(heteroaromatic)polymer block are selected from the group consisting of pyrroles, thiophenes, furans, indoles, isoindoles, thiazoles, imidazoles, triazoles, oxadiazoles, dithienobenzene, thianaphthene, benzothiophenes, isobenzothiophenes, benzofurans, isobenzofurans, their substituted derivatives, and mixtures thereof.

4. The electrically conductive block copolymer of claim 1 having a minimum of four polymer blocks.

5. The block copolymer of claim 1 wherein the at least one poly(heteroaromatic) polymer block is oxidized to a poly(cationic) form and is associated with organic or inorganic anions that balance the charge of the poly(cationic) block and which exhibits electrical conductivity between about $10^{-6}$-$10^3$ S/cm as measured with a four-point conductivity probe on a pressed pellet of the material.

6. The electrically conductive block copolymer of claim 5 which exhibits conductivity between about $10^{-3}$-$10^2$ S/cm.

7. The electrically conductive block copolymer of claim 5 which exhibits conductivity greater than about $10^{-3}$ S/cm.

8. The electrically conductive block copolymer of claim 5 which is soluble or dispersible in water, an organic solvent or in a mixture thereof at a concentration of at least about 0.1 g/liter.

9. The electrically conductive block copolymer of claim 5 which is soluble or dispersible in water, an organic solvent or in a mixture thereof at a concentration of at least about 1.0% (weight/volume).

10. The electrically conductive block copolymer of claim 5 wherein the at least two blocks of a second polymer are blocks of the same polymer.

11. The electrically conductive block copolymer of claim 5 wherein the heteroaromatic monomers of the poly(heteroaromatic) polymer block are selected from the group consisting of pyrroles, thiophenes, and their substituted derivatives.

12. The electrically conductive block copolymer of claim 5 wherein the blocks of the second polymer are poly(ethylene glycol).

13. The electrically conductive block copolymer of claim 5 wherein the at least one poly(heteroaromatic) polymer block comprises repeating units of a thiophene or a substituted derivative of a thiophene.

14. The electrically conductive block copolymer of claim 13 wherein the at least one poly(heteroaromatic) polymer block comprises repeating units of a thiophene carrying substituents in position 3 or in positions 3 and 4 on the aromatic ring.

15. The electrically conductive block copolymer of claim 14 wherein the substituents are an alkenyldioxy chain that completes a 3-, 4-, 5-, 6-, 7- or 8-membered alicyclic or aromatic ring.

16. The electrically conductive block copolymer of claim 14 wherein the substituents are an ethylenedioxy group.

17. The electrically conductive block copolymer of claim 16 wherein the polymer blocks of the second polymer are methacrylates.

18. The electrically conductive block copolymer of claim 16 wherein the second polymer blocks are selected from the group consisting of a poly(ethylene glycol), a poly(propylene glycol), an acrylonitrilebutadiene copolymer, a poly(dimethylsiloxane), a polyester, a polyol, and a polyalcohol.

19. The electrically conductive block copolymer of claim 14 wherein the at least one poly(heteroaromatic) polymer block comprises repeat units of a 3,4-substituted thiophene and wherein the substituents in 3 and 4 positions together complete a 3,4,5,6,7 or 8-membered alicyclic or aromatic ring which can optionally include one or more heteroatoms.

20. The electrically conductive block copolymer of claim 14 wherein the at least one poly(heteroaromatic) polymer block comprises repeating units that are substituted derivatives of a thiophene and wherein the substituent or substituents are selected from the group consisting of halogens, alkyl, fluoroalkyl, halogenated alkyl, alkenyl, alkoxy, carboxylate, alkylcarbonyl, akanoyl, alkylthio, mercapto, cycloalkoxy, alkenyidioxy, aryl, alkylaryl, arylalkyl, aryloxy, amino, alkylamino, dialkylamino, alkylcarbonylamino, alkylsulfinyl, aryloxyalkyl, alkoxylalkyl, polyetheralkyl, phosphate, phosphite, phosphine, hydroxyl, cyano, sulfonate, alkylsulfonate, arylsulfonate, alkylsulfate, arylsulfate, nitro, alkylsilane, arylsilane, an alkylene, alkenylene, alkenyloxy, alkenyidioxy, alkynyloxy, alkynyidioxy chain that completes a 3,4,5,6,7 or 8-membered alicyclic or aromatic ring which can optionally include one or more heteroatoms.

21. The electrically conductive block copolymer of claim 5 where the anions are inorganic anions.

22. The electrically conductive block copolymer of claim 5 where the anions are organic anions.

23. The electrically conductive block copolymer of claim 22 wherein the anions are para-toluenesulfonate anions.

24. The electrically conductive block copolymer of claim 5 wherein the repeating units of the poly(heteroaromatic) polymer block prior to oxidation have the formula:

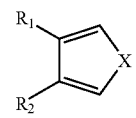

wherein X is NH, NR, S, O, Se or Te and
R, $R_1$ or $R_2$ are selected independently of one another from the group consisting of hydrogen, deuterium, halogens, alkyl, fluoroalkyl, halogenated alkyl, alkenyl, alkoxy, carboxylate, alkylcarbonyl, alkanoyl, alkylthio, mercapto, cycloalkoxy, alkenyidioxy, aryl, alkylaryl, arylalkyl, aryloxy, amino, alkylamino, dialkylamino, alkylcarbonylamino, alkylsulfinyl, aryloxyalkyl, alkoxylalkyl, polyetheralkyl, phosphate, phosphite, phosphine, hydroxyl, cyano, sulfonate, alkylsulfonate, arylsulfonate, alkylsulfate, arylsulfate, nitro, alkylsilane, and arylsilane groups, or $R_1$ and $R_2$ together form an alkylene, alkenylene, alkenyloxy, alkenyidioxy, alkynyloxy, or alkynyidioxy chain that completes a 3,4,5,6,7 or 8-membered alicyclic or aromatic ring which can optionally include one or more heteroatom including nitrogen, oxygen, sulfur, phosphorous, selenium, tellurium, or silicon.

25. The electrically conductive block copolymer of claim 24 wherein X is S and $R_1$ and $R_2$ together form an alkylene, alkenylene, alkenyloxy, alkenyidioxy, alkynyloxy, or alkynyidioxy chain that completes a 3-, 4-, 5-, 6-, 7- or 8-membered alicyclic or aromatic ring which can optionally include one or more heteroatom including nitrogen, oxygen, sulfur, phosphorous, selenium, tellurium, or silicon.

26. The electrically conductive block copolymer of claim 25 wherein X is S and $R_1$ and $R_2$ together form an alkylene or alkenylene chain that completes a 3-, 4-, 5-, 6-, 7- or 8-membered alicyclic or aromatic ring which can optionally include one or more heteroatom including nitrogen, oxygen, or sulfur.

27. The electrically conductive block copolymer of claim 5 having a minimum of four polymer blocks.

28. The electrically conductive block copolymer of claim 5 wherein the heteroaromatic monomers of the poly(heteroaromatic)polymer block are selected from the group consisting of pyrroles, thiophenes, furans, indoles, isoindoles, thiazoles, imidazoles, triazoles, oxadiazoles, dithienobenzene, benzothiophenes, isobenzothiophenes, benzofurans, isobenzofurans, their substituted derivatives, and mixtures thereof.

29. The electrically conductive block copolymer of claim 5 wherein the at least one poly(heteroaromatic) polymer block is selected from the group consisting of polymers of pyrroles, thiophenes, and their substituted derivatives.

30. A block copolymer which comprises at least one block of a poly(heteroaromatic) polymer and at least two blocks of a second polymer which is made by oxidative copolymerization of 3,4-ethylenedioxythiophene and a second polymer selected from the group consisting of a di-thiophene terminated polymer, a di-(3,4-ethylenedioxythiophene)-terminated polymer, a di-pyrrole terminated polymer, a monothiophene terminated polymer, a mono-pyrrole terminated polymer, and a mono-(3,4-ethylenedioxythiophene)-terminated polymer.

31. The block copolymer of claim 30 wherein the second polymer blocks are selected from the group consisting of a poly(ethylene glycol), a poly(propylene glycol), an acrylonitrilebutadiene copolymer, a poly(dimethylsiloxane), a polyester, a polyol, and a polyalcohol.

32. The block copolymer of claim 30 wherein the at least one poly(heteroaromatic) polymer block is oxidized to a poly(cationic) form and is associated with organic or inorganic anions that balance the charge of the poly(cation) block and which exhibits electrical conductivity.

33. A block copolymer which comprises at least one block of a poly(heteroaromatic) polymer and at least two blocks of a second polymer
wherein:
the poly(heteroaromatic) polymer comprises repeating units of one or more heteroaromatic monomers which are bonded to each other by chemical bonds formed between carbon atoms of the heteroaromatic rings of the monomers and are selected from the group consisting of pyrroles, thiophenes, selenophenes, tellurophenes, furans, indoles, isoindoles, pyridines, pyrimidines, pyrazines, triazines, imidazoles, quinolines, isoquinolines, benzimidazoles, thiazoles, triazoles, oxadiazoles, dithienobenzene, carbazoles, benzothiophenes, isobenzothiophenes, benzofurans, isobenzofurans, isobenzoselenophenes, isobenzotellurophenes, their substituted derivatives, and mixtures thereof;
the at least two second polymer blocks are selected from the group consisting of polyethers, poly(fluoroethers), polyglycols, polyacetals, polyolefins, polystyrene, polyfluoroolefins, polyoxides, polychlorolefins, polychlorofluoroolefins, polysiloxanes, polyesters, polybromoesters, natural and synthetic rubbers, polyols, polyalcohols, polyacids, polycarbonates, polyanhydrides, polysulfides, polyamides, polyamines, polyimides, vinyl polymers, polymers derived from the polymerization of unsaturated monomers, polyacrylates, polymethacrylates, polyacrylonitriles, polybutadiene, alkyds, polyurethanes, epoxies, cellulose and its derivatives, starch and its derivatives, polypeptides, and copolymers thereof;
wherein the blocks of the second polymer contain reactive functional groups that can undergo further polymerization reactions and wherein the at least two blocks of the second polymer are not linked to each other,
wherein the poly(heteroaromatic) polymer blocks are oxidized to a poly(cation) and are associated with organic or inorganic anions that balance the charge of the poly(cation) and which exhibits electrical conductivity between about $10^{-6}$-$10^3$ S/cm as measured with a four-point conductivity probe on a pressed pellet of the material.

34. The electrically conductive block copolymer of claim 33 wherein the reactive functional groups that can undergo further polymerization reactions are selected from the group consisting of acrylates, methacrylates, hydroxyl groups, epoxy groups, isocyanates, dienes, vinyl groups, and vinyl ethers.

35. The electrically conductive block copolymer of claim 34 wherein the reactive functional groups are methacrylates.

36. The electrically conductive block copolymer of claim 33 wherein the reactive functional groups that can undergo further polymerization reactions are selected from acrylates and methacrylates.

37. Polymerized or cross-linked materials made by polymerization or cross-linking of the copolymers of claim 33.

38. Polymerized or cross-linked materials of claim 37 made by free radical polymerization.

39. The electrically conductive block copolymer of claim 33 wherein the at least one poly(heteroaromatic) polymer block comprises repeat units of thiophene or a substituted derivative of a thiophene.

40. The electrically conductive block copolymer of claim 39 wherein the at least one poly(heteroaromatic) polymer block is poly(3,4-ethylenedioxythiophene).

41. The electrically conductive block copolymer of claim 40 wherein the second polymer blocks contain at least one methacrylate group.

42. A block copolymer which comprises at least one block of a poly(heteroaromatic) polymer and at least two blocks of a second polymer wherein:
the poly(heteroaromatic) polymer block comprises repeating units of one or more heteroaromatic monomers which are bonded to each other by chemical bonds formed between carbon atoms of the heteroaromatic rings of the monomers and are selected from the group consisting of pyrroles, thiophenes, selenophenes tellurophenes, furans, indoles, isoinoles, isothianaphthalenes, pyridines, pyrimidines, pyrazines, triazines, imidazoles, quinolines, isoquinolines, benzimidazoles, thiazoles, oxidiazoles, benzopyrrolines, dithienobenzene, thianaphtene, carbazoles, benzothiophenes, isobenzothiophenes, benzofurans, isobenzofurans, isoindolines, isobenzoselenophenes, isobenzotellurophenes, their substituted derivatives, and mixtures thereof;

the at least two second polymer blocks are selected from the group consisting of polyethers, poly(fluoroethers), polyglycols, polyactals, polyolefins, polystyrene, polyfluoroolefins, polyoxides, polychlorolefins, polychlorofluoroolefins, polysiloxanes, polyesters, polybromoesters, natural and synthetic rubbers, polyols, polyalcohols, polyacids, polycarbonates, polyanhydrides, polysulfides, polyamides, polyamines, polyimides, vinyl polymers, polymers derived from the polymerization of unsaturated monomers, polyacrylates, polymethacrylates, polyacrylonitriles, polybutadiene, alkyds, polyurethanes, epoxies, cellulose and its derivatives, starch and its derivatives, polypeptides, and copolymers thereof, wherein the at least two blocks of the second polymer are not linked to each other; and wherein the at least one poly(heteroaromatic) polymer block is a polymer of 3,4-ethylenedioxythiophene and the second polymer blocks are independently selected from the group consisting of di-thiophene terminated polymer, di-(3,4-ethylenedioxythiophene)-terminated polymer, di-pyrrole terminated polymer, mono-thiophene terminated polymer, mono-pyrrole terminated polymer, and a mono-(3,4-ethylenedioxythiophene)-terminated polymer.

43. The block copolymer of claim 42 wherein second polymer blocks are selected from the group consisting of di-(3,4-ethylenedioxythiophene)-terminated poly(ethylene glycol), di-(3,4-ethylenedioxythiophene)-terminated poly(propylene glycol), di-(3,4-ethylenedioxythiophene)-terminated acrylonitrilebutadiene copolymer, di-(3,4-ethylenedioxythiophene)-terminated poly(dimethylsiloxane), di-(3,4-ethylenedioxythiophene)-terminated polyester, di-(3,4-ethylenedioxythiophene)-terminated polyol, di-(3,4-ethylenedioxythiophene)-terminated polyalcohol, mono-(3,4-ethylenedioxythiophene)-terminated poly(ethylene glycol), mono-(3,4-ethylenedioxythiophene)-terminated poly(propylene glycol), mono-(3,4-ethylenediox-ythiophene)-terminated acrylonitrilebutadiene copolymer, mono-(3,4-ethylenedioxythiophene)-terminated poly(dimethylsiloxane), mono-(3,4-ethylenedioxythiophene)-terminated polyester, mono-(3,4-ethylenedioxythiophene)-terminated polyol, and mono-(3,4-ethylenedioxythiophene)-terminated polyalcohol.

44. A polymer selected from the group consisting of a poly(ethylene glycol), a poly(propylene glycol), an acrylonitrilebutadiene copolymer, a poly(dimethylsiloxane), a polyester, a polyol, and a polyalcohol which comprises one or two terminal groups that undergo oxidative polymerization, wherein the one or two terminal groups are 2-(3,4-ethylenedioxy)thienyl groups.

45. A block copolymer which comprises at least one block of a poly(heteroaromatic) polymer and at least two blocks of a second polymer wherein the poly(heteroaromatic) polymer block comprises repeating units of one or more heteroaromatic monomers which are bonded to each other by chemical bonds formed between carbon atoms of the heteroaromatic rings of the monomers and the at least two blocks of the second polymer are not linked to each other and which has the formula:

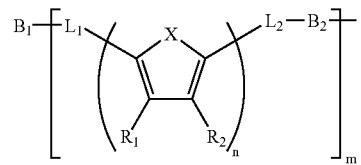

wherein X is NH, NR, S, O, Se or Te;

m and n are integers where n is greater than or equal to 3 and m is greater than or equal to 1;

R, $R_1$ or $R_2$ are selected independently of one another from the group consisting of hydrogen, deuterium, halogens, alkyl, fluoroalkyl, halogenated alkyl, alkenyl, alkoxy, carboxylate, alkylcarbonyl, alkanoyl, alkylthio, mercapto, cycloalkoxy, alkenyldioxy, aryl, alkylaryl, arylalkyl, aryloxy, amino, alkylamino, dialkylamino, alkylcarbonylamino, alkylsulfinyl, aryloxyalkyl, alkoxylalkyl, polyetheralkyl, phosphate, phosphite, phosphine, hydroxyl, cyano, sulfonate, alkylsulfonate, arylsulfonate, alkylsulfate, arylsulfate, nitro, alkylsilane, and arylsilane groups, or $R_1$ and $R_2$ together form an alkylene, alkenylene, alkenyloxy, alkenyldioxy, alkynyloxy, or alkynyldioxy chain that completes a 3,4,5,6,7 or 8-membered alicyclic or aromatic ring which can optionally include one or more heteroatom including nitrogen, oxygen, sulfur, phosphorous, selenium, tellurium, or silicon; and wherein the polymerization reaction couples the aromatic rings to each other at positions adjacent X as shown;

$L_1$ and $L_2$ are optional linker groups which if present are selected from aliphatic acids, aromatic amino groups, phenols, substituted thiophenes, pyrroles, furans, furan derivatives, carbonyl compounds, quinones, halogenated compounds, acetylenes, phosphorous containing compounds, and thiols; and $B_1$ and $B_2$ are the same or different and are selected from polyethers, poly(fluoroethers), polyglycols, polyacetals, polyolefins, polystyrene, polyfluoroolefins, polyoxides, polychlorolefins, polychlorofluoroolefins, polysiloxanes, polyesters, polybromoesters, natural and synthetic rubbers, polyols, polyalcohols, polyacids, polycarbonates, polyanhydrides, polysulfides, polyamides, polyamines, polyimides, vinyl polymers, polymers derived from the polymerization of unsaturated monomers, polyacrylates, polymethacrylates, polyacrylonitriles, polybutadiene, alkyds, polyurethanes, epoxies, cellulose and its derivatives, starch and its derivatives, polypeptides, and copolymers thereof.

46. The block copolymer of claim 45 wherein $L_1$ and $L_2$ are not present.

47. An electrically conductive block copolymer which comprises at least one block of a poly(heteroaromatic) polymer that comprises repeat units of one or more heteroaromatic monomers which are bonded to each other by chemical bonds formed between carbon atoms of the heteroaromatic rings of the monomers and are selected from the group consisting of pyrroles, thiophenes, or their substituted derivatives and at least two blocks of a second polymer selected from the group consisting of a poly(ethylene glycol), a poly(propylene glycol), an acrylonitrilebutadiene copolymer, a poly(dimethylsiloxane), a polyester, a polyol, and a polyalcohol wherein the poly(heteroaromatic) polymer blocks are oxidized to a poly(cationic) form and are associated with anions, wherein the oxidized form exhibits electrical conductivity when the conductivity of the dry solid material is measured with a four-point conductivity probe and wherein the at least two blocks of the second polymer are not linked to each other.

48. The electrically conductive block copolymer of claim 47 wherein the second polymer is a poly(ethylene glycol).

49. The electrically conductive block copolymer of claim 47 wherein the at least one poly(heteroaromatic) polymer block is a polymer of 3,4-ethylenedioxythiophene and the polymer blocks of the second polymer are di-(3,4-ethylenedioxythiophene)-terminated polymers.

50. The electrically conductive block copolymer of claim 5 wherein the block copolymer prior to oxidation has the formula:

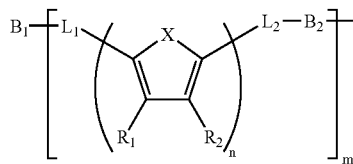

wherein X is NH, NR, S, O, Se or Te;

m and n are integers where n is greater than or equal to 3 and m is greater than or equal to 1;

R, $R_1$ or $R_2$ are selected independently of one another from the group consisting of hydrogen, deuterium, halogens, alkyl, fluoroalkyl, halogenated alkyl, alkenyl, alkoxy, carboxylate, alkylcarbonyl, alkanoyl, alkylthio, mercapto, cycloalkoxy, alkenyldioxy, aryl, alkylaryl, arylalkyl, aryloxy, amino, alkylamino, dialkylamino, alkylcarbonylamino, alkylsulfinyl, aryloxyalkyl, alkoxylalkyl, polyetheralkyl, phosphate, phosphite, phosphine, hydroxyl, cyano, sulfonate, alkylsulfonate, arylsulfonate, alkylsulfate, arylsulfate, nitro, alkylsilane, and arylsilane groups, or $R_1$ and $R_2$ together form an alkylene, alkenylene, alkenyloxy, alkenyldioxy, alkynyloxy, or alkynyldioxy chain that completes a 3,4,5,6,7 or 8-membered alicyclic or aromatic ring which can optionally include one or more heteroatom including nitrogen, oxygen, sulfur, phosphorous, selenium, tellurium, or silicon; and wherein the polymerization reaction couples the aromatic rings to each other at positions adjacent X as shown;

$L_1$ and $L_2$ are optional linker groups which if present are selected from aliphatic acids, aromatic amino groups, phenols, substituted thiophenes, pyrroles, furans, furan derivatives, carbonyl compounds, quinones, halogenated compounds, acetylenes, phosphorous containing compounds, and thiols; and $B_1$ and $B_2$ are the same or different and are selected from polyethers, poly(fluoroethers), polyglycols, polyacetals, polyolefins, polystyrene, polyfluoroolefins, polyoxides, polychloroolefins, polychlorofluoroolefins, polysiloxanes, polyesters, polybromoesters, natural and synthetic rubbers, polyols, polyalcohols, polyacids, polycarbonates, polyanhydrides, polysulfides, polyamides, polyamines, polyimides, vinyl polymers, polymers derived from the polymerization of unsaturated monomers, polyacrylates, polymethacrylates, polyacrylonitriles, polybutadiene, alkyds, polyurethanes, epoxies, cellulose and its derivatives, starch and its derivatives, polypeptides, and copolymers thereof.

51. The electrically conductive block copolymer of claim 50 wherein $L_1$ and $L_2$ are not present.

* * * * *